United States Patent
Hamada et al.

(10) Patent No.: US 8,744,174 B2
(45) Date of Patent: Jun. 3, 2014

(54) IMAGE PROCESSING APPARATUS, IMAGE PROCESSING METHOD, AND STORAGE MEDIUM

(75) Inventors: Akira Hamada, Tokyo (JP); Kenji Sato, Tokyo (JP); Katsunori Ishii, Tokyo (JP); Shinichi Matsui, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 162 days.

(21) Appl. No.: 13/315,785

(22) Filed: Dec. 9, 2011

(65) Prior Publication Data

US 2012/0148151 A1    Jun. 14, 2012

(30) Foreign Application Priority Data

Dec. 10, 2010 (JP) ................................. 2010-275674

(51) Int. Cl.
*G06K 9/00* (2006.01)
(52) U.S. Cl.
USPC .......................................... 382/164; 382/173
(58) Field of Classification Search
USPC ............................ 382/162, 164, 173, 180, 199
See application file for complete search history.

(56) References Cited

U.S. PATENT DOCUMENTS

| | | | |
|---|---|---|---|
| 6,281,903 B1 * | 8/2001 | Martin et al. ................. | 345/421 |
| 8,013,870 B2 | 9/2011 | Wilensky | |
| 8,264,500 B2 | 9/2012 | Wilensky | |
| 2006/0098112 A1 | 5/2006 | Kelly | |
| 2007/0269108 A1 * | 11/2007 | Steinberg et al. ............. | 382/173 |

FOREIGN PATENT DOCUMENTS

| | | |
|---|---|---|
| CN | 101536078 A | 9/2009 |
| JP | 2000-030037 A | 1/2000 |
| JP | 2004-077958 A | 3/2004 |
| JP | 2005-267259 A | 9/2005 |
| JP | 2008-519505 A | 6/2008 |

OTHER PUBLICATIONS

Japanese Office Action dated Sep. 11, 2012 (and English translation thereof) in counterpart Japanese Application No. 2010-275674.
Chinese Office Action dated Dec. 3, 2013 (and English translation thereof) in counterpart Chinese Application No. 201110404074.8.

* cited by examiner

*Primary Examiner* — Phuoc Tran
(74) *Attorney, Agent, or Firm* — Holtz Holtz Goodman & Chick PC

(57) ABSTRACT

An image processing apparatus, comprising: a detecting unit that detects a foreground area including a foreground object, a background area, and a boundary area between the foreground area and the background area, from data of a processing target image; and a display control unit that executes a control to display the boundary area in a first color distinguishable from other areas and the background area in a second color different from the first color when the processing target image is displayed.

5 Claims, 22 Drawing Sheets

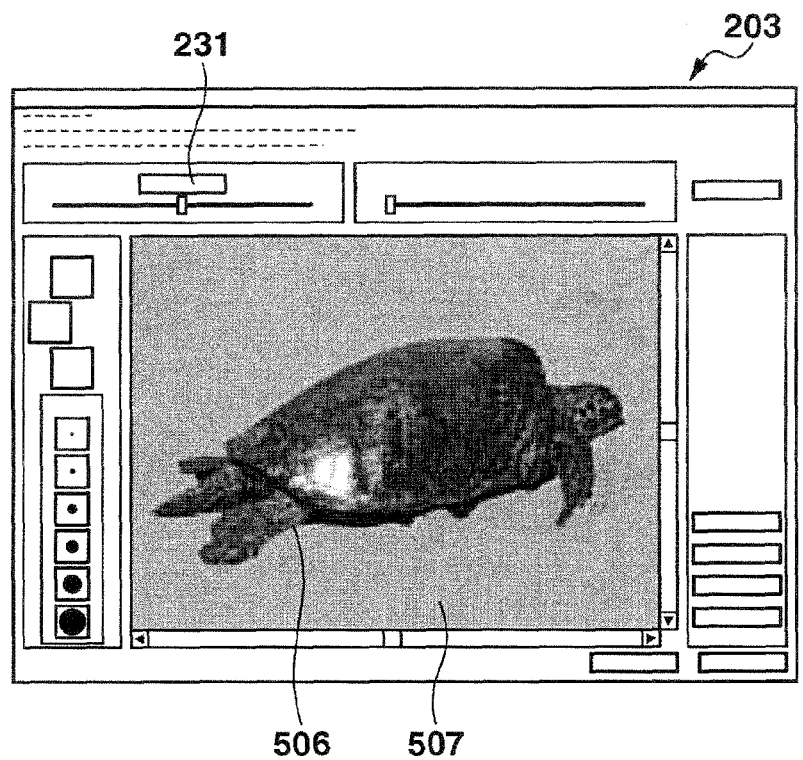
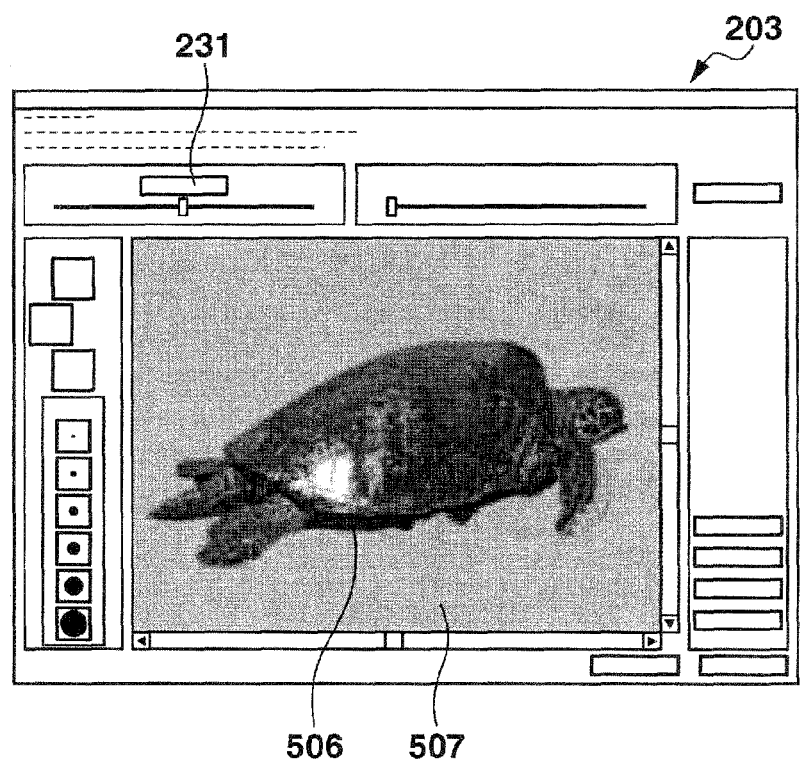

IMAGE PROCESSING APPARATUS, IMAGE PROCESSING METHOD, AND STORAGE MEDIUM

This application is based on and claims the benefit of priority from Japanese Patent Application No. 2010-275674, filed on 10 Dec. 2010, the content of which is incorporated herein by reference.

BACKGROUND OF THE INVENTION

1. Field of the Invention

The present invention relates to an image processing apparatus, image processing method, and storage medium.

2. Related Art

Conventionally, a technology exists in which a foreground object such as a person is combined with an arbitrary background, and a composite image acquired as a result thereof is printed.

For example, as a technology of combining a photograph of a person or the like with another background and printing the result thereof, there is disclosed a technology of projecting another background image directly on a screen behind the person (see Japanese Patent Application Publication No. 2004-77958). Also, the aforementioned publication discloses a technology of projecting a blue background to be used for chroma key composition, and a technology of combining the blue background and the chroma key composition processing, which is popularly used in movie production.

Recently, there is a demand for combining a foreground object cut out from an arbitrary image with an arbitrary background by image processing only, without using a screen, projection apparatus, or the like. However, the technology disclosed by the aforementioned publication fails to meet such a demand.

SUMMARY OF THE INVENTION

It is an object of the present invention to realize image processing required to combine a foreground object cut out from an arbitrary image with an arbitrary background, and also simplify an operation for the image processing.

In accordance with a first aspect of the present invention, there is provided an image processing apparatus, comprising: a detecting unit that detects a foreground area including a foreground object, a background area, and a boundary area between the foreground area and the background area, from data of a processing target image including the foreground object; and a display control unit that executes a control to display the boundary area in a first classification color distinguishable from other areas and the background area in a second classification color different from the first classification color when the processing target image is displayed.

In accordance with a second aspect of the present invention, there is provided an image processing method by an image processing apparatus that carries out image processing on data of a processing target image including a foreground object, comprising: a detecting step of detecting a foreground area including the foreground object, a background area, and a boundary area between the foreground area and the background area from data of a processing target image; and a display control step of executing a control to display the boundary area in a first classification color distinguishable from other areas and the background area in a second classification color different from the first classification color when the processing target image is displayed.

In accordance with a third aspect of the present invention, there is provided a storage medium having stored therein a program causing a computer that controls image processing to be carried out on data of a processing target image including a foreground object, to function as:

a detecting unit that detects a foreground area including a foreground object, a background area, and a boundary area between the foreground area and the background area, from data of a processing target image including the foreground object; and a display control unit that executes a control to display the boundary area in a first classification color distinguishable from other areas and the background area in a second classification color different from the first classification color when the processing target image is displayed.

BRIEF DESCRIPTION OF THE DRAWING

FIG. 23 is a diagram showing one example of a screen displayed when the image processing system shown in FIG. 4 carries out the cut-out processing;

FIG. 24 is a diagram showing one example of a screen displayed when the image processing system shown in FIG. 4 carries out the cut-out processing;

DETAILED DESCRIPTION OF THE INVENTION

An embodiment of the present invention will be described hereinafter with reference to the drawings.

Figure 1:
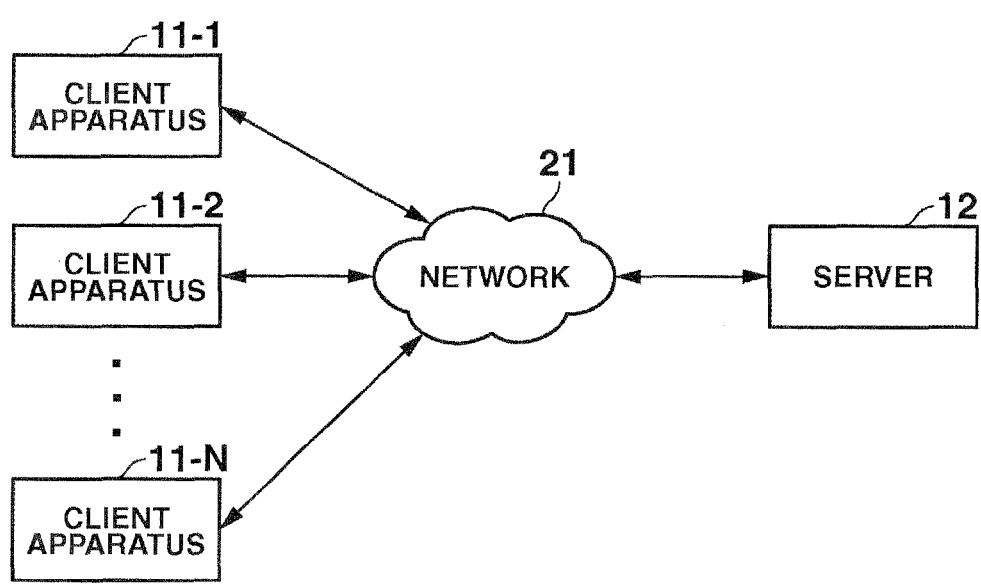
FIG. 1 is a block diagram illustrating an image processing system according to an embodiment of the present invention.

FIG. 1 is a block diagram illustrating an image processing system according to an embodiment of the present invention.

The image processing system shown in FIG. 1 includes client apparatuses 11-1 to 11-N (N is any integer greater than 0) and a server 12.

The client apparatuses 11-1 to 11-N and the server 12 are connected with one another through a predetermined network 21 such as the Internet.

In the following, the client apparatuses 11-1 to 11-N are inclusively referred to as "client apparatus 11" unless a distinction between individual client apparatuses is necessary.

The client apparatus 11 can collaborate with the server 12 connected therewith through the network 21 to carry out image processing having, as an original image, an image including an object of interest (hereinafter referred to as "foreground") such as a person, and cut-out the foreground from the original image. Such image processing is hereinafter referred to as "cut-out processing".

The foreground thus cut out from the original image by means of the cut-out processing is combined with another background different from the original image, and a composite image acquired as a result thereof is printed on a medium such as paper, and provided to a user.

Figure 2:
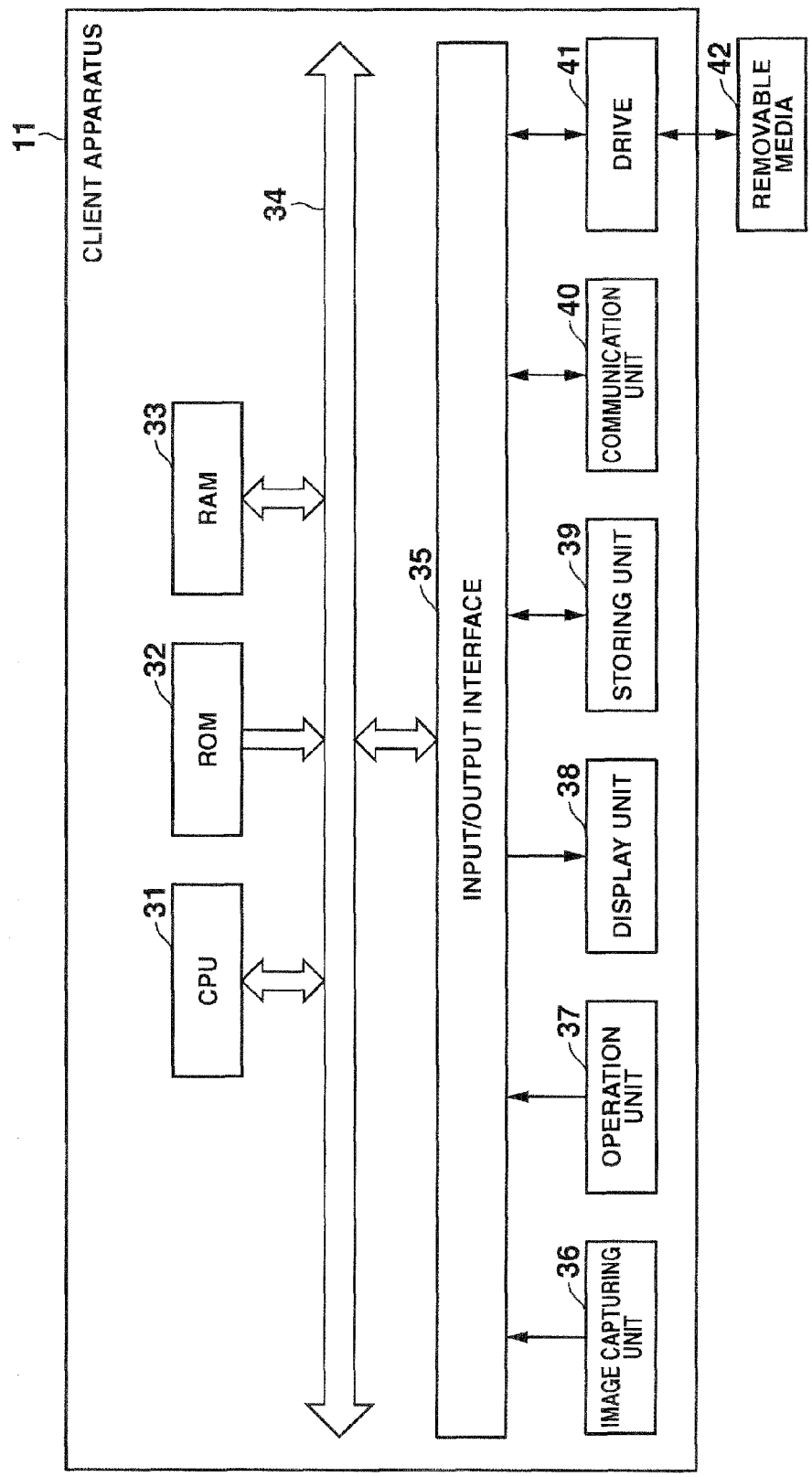
FIG. 2 is a block diagram illustrating a hardware configuration of a client apparatus of the image processing system shown in FIG. 1.

FIG. 2 is a block diagram illustrating a hardware configuration of the client apparatus 11 for carrying out such cut-out processing. The client apparatus 11 may be constituted by, for example, a personal computer with attached camera.

The client apparatus 11 includes a CPU (Central Processing Unit) 31, a ROM (Read Only Memory) 32, a RAM (Random Access Memory) 33, a bus 34, an input/output interface 35, an image capturing unit 36, an operation unit 37, a display unit 38, a storing unit 39, a communication unit 40, and a drive 41.

The CPU 31 executes various processes in accordance with programs stored in the ROM 32. Alternatively, the CPU 31 executes various processes in accordance with programs that are loaded from the storing unit 39 to the RAM 33.

The RAM 33 also stores data and the like necessary for the CPU 31 to execute the various processes as appropriate.

For example, in the present embodiment, programs for implementing functions of a communication control unit 101 shown in FIG. 4, which will be described later, is stored in the ROM 32 or the storing unit 39. Furthermore, programs for implementing functions of a cut-out processing unit 102 shown in FIG. 4, which will be described later, are supplied from the server 12 and deployed in the RAM 33. These programs are used for executing the cut-out processing and hereinafter referred to as "programs for cut-out processing". Therefore, each of the functions of the communication control unit 101 and the cut-out processing unit 102 shown in FIG. 4 can be realized by the CPU 31 executing processes according to these programs.

The CPU 31, the ROM 32, and the RAM 33 are connected to one another via the bus 34. The bus 34 is also connected with the input/output interface 35. The image capturing unit 36, the operation unit 37, the display unit 38, the storing unit 39, the communication unit 40, and the drive 41 are connected to the input/output interface 35.

The image capturing unit 36 is composed of an optical lens unit and an image sensor, which are not illustrated in the drawings.

The optical lens unit is constituted by a light condensing lens such as a focus lens, a zoom lens, and the like, for example, to photograph a subject.

The focus lens is a lens that forms an image of a subject on the light receiving surface of the image sensor. The zoom lens is a lens for freely changing a focal length within a predetermined range.

The optical lens unit includes peripheral circuits that adjust setting parameters such as focus, exposure, white balance, and the like as necessary.

The image sensor is constituted by an optoelectronic conversion device, an AFE (Analog Front End), and the like. The optoelectronic conversion device is constituted by a CMOS (Complementary Metal Oxide Semiconductor) type optoelectronic conversion device, or the like, for example. An image of a subject is made incident through the optical lens unit on the optoelectronic conversion device. The optoelectronic conversion device optoelectronically converts (i.e., captures) an image of a subject as an image signal at a predetermined interval, stores the image signal thus converted, and sequentially supplies the stored image signal to the AFE as an analog signal.

The AFE executes various kinds of signal processing such as A/D (Analog/Digital) conversion on the analog image signal. As a result of the various kinds of signal processing, a digital signal is generated and outputted as an output signal from the image capturing unit 36.

Hereinafter, the output signal from the image capturing unit 36 is referred to as "data of a captured image". Thus, data of a captured image is outputted from the image capturing unit 36 and provided as appropriate to the CPU 31 and the like.

The operation unit 37 is constituted by a keyboard, a mouse, and the like, and receives a user operation instruction.

The display unit 38 is constituted by an LCD (Liquid Crystal Device) display, or the like, and displays various images.

The storing unit 39 is constituted by a hard disk and the like and temporarily stores data of target images of image processing such as data of captured images outputted from the image capturing unit 36. Also, the storing unit 39 stores various kinds of data necessary for various kinds of image processing, such as image data, values of various flags, threshold values, and the like.

The communication unit 40 controls communication with other devices such as the server 12 (FIG. 1) via the network 21.

For example, in the present embodiment, there is a case in which the programs for cut-out processing are sent from the server 12, as described above, in addition to the various kinds of data. In this case, the communication unit 40 receives the programs for cut-out processing and temporarily stores them in the storing unit 39. The programs for cut-out processing stored in the storing unit 39 are deployed in the RAM 33 and executed by the CPU 31.

Removable media 42 such as a magnetic disk, an optical disk, a magneto-optical disk, or a semiconductor memory is mounted to the drive 41, as appropriate.

Programs read via the drive 41 from the removable media 42 are installed in the storing unit 39 as necessary. Furthermore, similar to the storing unit 39, the removable media 42 can store various kinds of data such as image data and the like, stored in the storing unit 39.

Figure 3:
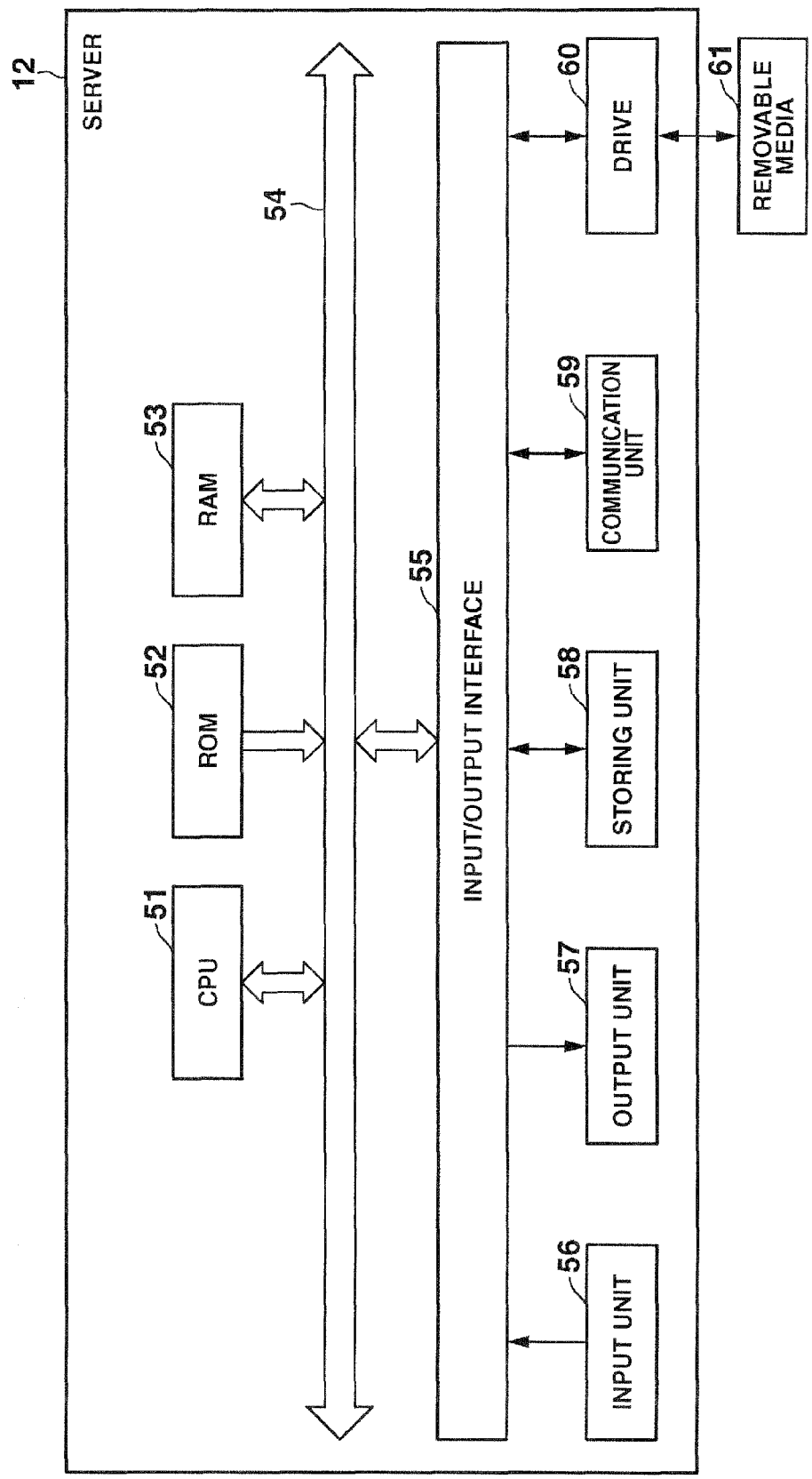
FIG. 3 is a block diagram showing a hardware configuration of a server of the image processing system shown in FIG. 1.

FIG. 3 is a block diagram showing a hardware configuration of the server 12 collaborating with the client apparatus 11 to carry out the cut-out processing.

The server 12 is provided with a CPU 51, a ROM 52, a RAM 53, a bus 54, an input/output interface 55, an input unit 56, an output unit 57, a storing unit 58, a communication unit 59, and a drive 60.

The CPU 51 executes various processes according to programs that are stored in the ROM 52. Alternatively, the CPU 51 executes various processes according to programs that are loaded from the storing unit 58 to the RAM 53.

The RAM 53 also stores data and the like necessary for the CPU 51 to execute the various processes as appropriate.

For example, according to the present embodiment, programs for implementing functions of a communication control unit 151 and a main control unit 152 shown in FIG. 4, which will be described later, are stored in the ROM 52 or the storing unit 58. Therefore, each of the functions of the communication control unit 151 and the main control unit 152 shown in FIG. 4 can be realized by the CPU 51 executing the processes according to these programs.

The CPU 51, the ROM 52, and the RAM 53 are connected to each other via the bus 54. The bus 54 is also connected with the input/output interface 55. The input unit 56, the output unit 57, the storing unit 58, the communication unit 59, and the drive 60 are connected to the input/output interface 55.

The input unit 56 is constituted by a keyboard, a mouse, and the like, and inputs various kinds of information.

The output unit 57 is constituted by an LCD display, a speaker, a printer, and the like, and outputs various kinds of information. For example, a foreground cut out from the original image by means of the cut-out processing of the client apparatus 11 and another new background different from the original image are combined, and a composite image acquired as a result thereof is printed on a medium such as paper by the printer.

The storing unit 58 is constituted by a hard disk or the like and stores various kinds of information.

The communication unit 59 controls communication with other devices such as the client apparatus 11 (FIG. 1) via the network 21.

Removable media 61 such as a magnetic disk, an optical disk, a magneto-optical disk, or a semiconductor memory is mounted to the drive 60, as appropriate.

Programs read via the drive 60 from the removable media 61 are installed in the storing unit 58 as necessary. Furthermore, similar to the storing unit 58, the removable media 61 can store various kinds of data such as image data and the like, stored in the storing unit 58.

Figure 4:
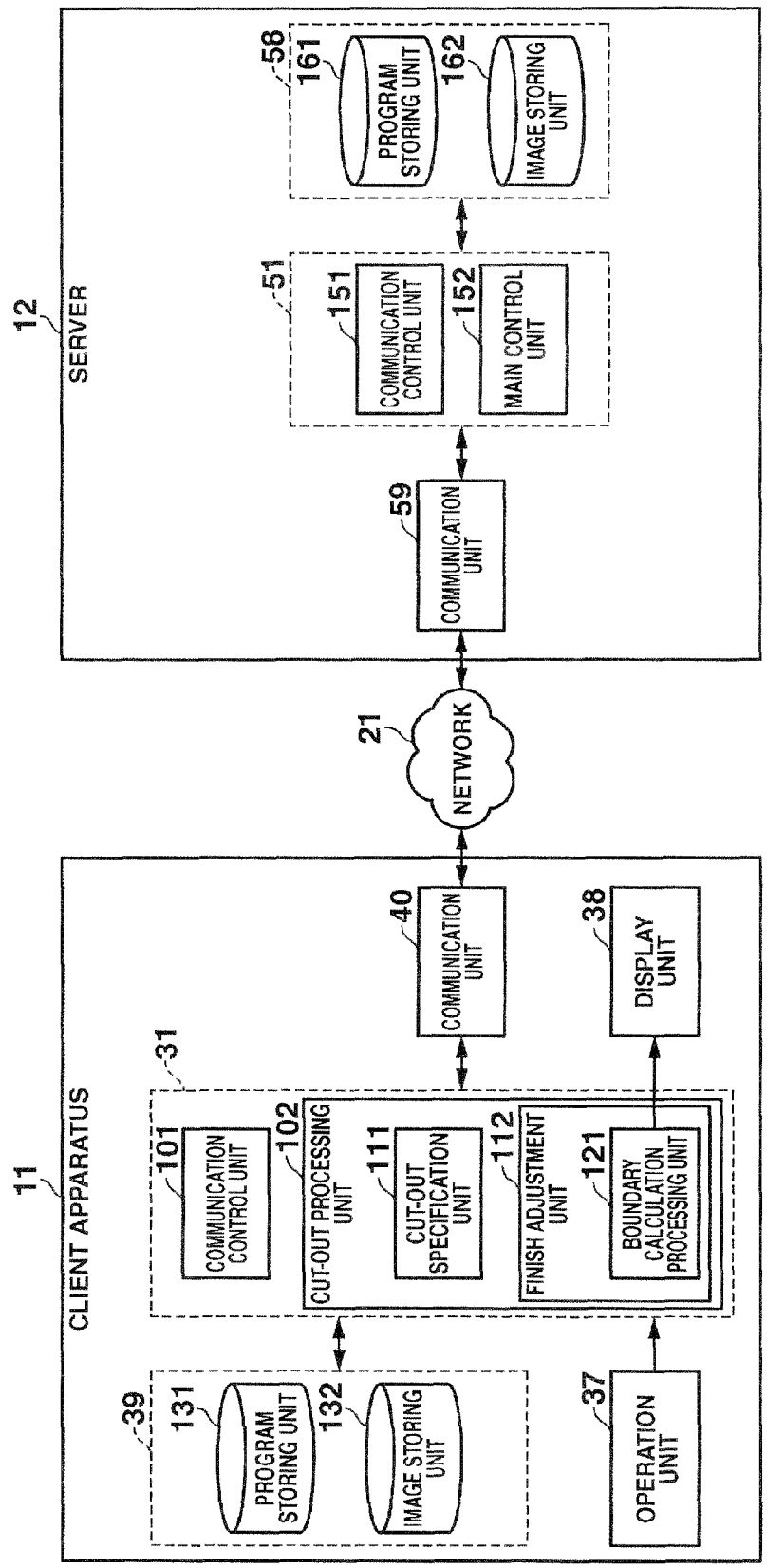
FIG. 4 is a functional block diagram showing a functional configuration of the image processing system in a case in which the client apparatus having the hardware configuration shown in FIG. 2 and the server having the hardware configuration shown in FIG. 3 collaborate with each other to carry out cut-out processing.

FIG. 4 is a functional block diagram showing a functional configuration of the image processing system in a case in which the client apparatus 11 having the hardware configuration shown in FIG. 2 and the server 12 having the hardware configuration shown in FIG. 3 collaborate with each other to carry out the cut-out processing.

Functional Configuration of the Client Apparatus 11

First, a description will be given of a functional configuration of the client apparatus 11 from among the constituent elements of the image processing system.

When the client apparatus 11 communicates with the server 12 via the network 21, a communication control unit 101 operates in the CPU 31 of the client apparatus 11.

The communication control unit 101 executes control to connect with the server 12 via the communication unit 40 and the network 21 and to exchange various kinds of information.

For example, when the programs for cut-out processing are sent from the server 12, the communication control unit 101 causes the communication unit 40 to receive them via the network 21, and causes a program storing unit 131, which will be described later, of the storing unit 39 to temporarily store them.

When the programs for cut-out processing thus stored in the program storing unit 131 are deployed in the RAM 33 (FIG. 2) and executed, the cut-out processing unit 102 operates in the CPU 31.

The cut-out processing unit 102 is provided with a cut-out designation unit 111 and a finish adjustment unit 112 in order to execute cut-out designation processing. The finish adjustment unit 112 includes a boundary calculation processing unit 121.

Therefore, the programs for cut-out processing that realizes the cut-out processing are broadly classified into a cut-out designation program and a finish adjustment program.

When the cut-out designation program from among the programs for cut-out processing is executed, the cut-out designation unit 111 operates from the cut-out processing unit 102.

The cut-out designation program is a program to implement a series of processing (hereinafter, referred to as "cut-out designation processing") that specifies a foreground area (hereinafter, referred to as a "select area") selected to be cut out by a user from an original image to be processed, performs calculation to finely finish a boundary part of the select area (to smooth the overlapped portion of a boundary area), and stores the calculation result.

Hereinafter, the calculation to finely finish the boundary part of the select area (to smooth the overlapped portion of the boundary area) is referred to as a "boundary calculation".

As for the cut-out designation program, it is possible to save data when the processing is still in a state of being in progress. Accordingly, when the data saved when the processing is still in a state of being in progress is read again, the processing can be resumed from the state at the time of being saved. This means that a user can continue the operation from the state when the data has been saved.

On the other hand, when the finish adjustment program from among the programs for cut-out processing is executed, the finish adjustment unit 112 of the cut-out processing unit 102 operates.

Even if only the above-described cut-out designation program is executed, it is possible to acquire data which enables specifying of a select area having the boundary area finely finished. However, there may be cases in which the user desires to acquire a composite image of higher resolution or to adjust the boundary area. The finish adjustment program is a program to be executed in such cases.

In the finish adjustment program, a result of the cut-out designation processing by the cut-out designation program is read, and various types of processing (hereinafter, inclusively referred to as "finish adjustment processing") accompanied by the boundary calculation are executed. Since the boundary calculation in the finish adjustment processing is further accompanied by matte processing, which will be described later, processing to execute the boundary calculation including the matte processing is hereinafter referred to as "boundary calculation processing".

When the matte processing is executed, the boundary calculation processing unit 121 operates from the finish adjustment unit 112.

In the finish adjustment program, it is possible to save data when the processing is in a state of being in progress. Accordingly, when the data saved when the processing is in a state of being progress, is read again, the processing can be resumed from the state at the time of being saved. This means that the user can continue the operation from the state in which the data has been saved.

Further details of respective functions of the cut-out designation unit 111, the finish adjustment unit 112, and the boundary calculation processing unit 121 will be described later with reference to the drawings of FIG. 5 and thereafter.

In the present embodiment, the communication control unit 101 and the cut-out processing unit 102 are constituted as a combination of the CPU 31 as hardware and programs as software, from among the constituent elements shown in FIG. 2.

However, this is an example, and at least a part of the functions of the communication control unit 101 and the cut-out processing unit 102 can clearly be transferred to a constituent element other than the CPU 31.

In the present embodiment, the program storing unit 131 and the image storing unit 132 are provided as a storage area of the storing unit 39.

The program storing unit 131 stores, in advance, a program to implement the communication control unit 101. Furthermore, as described above, when the programs for cut-out processing are received under the control of the communication control unit 101, the programs for cut-out processing are stored in the program storing unit 131.

The image storing unit 132 stores data of various images to be processed when the cut-out processing unit 102 executes the cut-out processing in a predetermined file format. More specific examples of possible image data to be stored in the image storing unit 132 will be described later.

Providing the program storing unit 131 and the image storing unit 132 as a storage area of the storing unit 39 is only an example. For example, the program storing unit 131 and the image storing unit 132 may be provided as a storage area of the removable media 42. Furthermore, the image storing unit 132 does not need to be provided in the client apparatus 11, but may be provided in any other device connected via the communication unit 40 and the network 21, for example.

In the above, a description has been given of the functional configuration of the client apparatus 11 from among the constituent elements of the image processing system. In the following, a description will be given of the functional configuration of the server 12 from among the constituent elements of the image processing system.

Functional Configuration of the Server 12

When the client apparatus 11 collaborates with the server 12, with which the client apparatus 11 is connected via the network 21, to carry out the cut-out processing, a communication control unit 151 and a main control unit 152 operate with respect to the CPU 51 of the server 12.

The communication control unit 151 executes control to connect with the client apparatus 11 via the communication unit 59 and the network 21 and to exchange various kinds of information.

For example, when accessed from the client apparatus 11 (for example, when login processing, which will be described later, is executed) the communication control unit 151 reads programs for cut-out processing stored in a program storing unit 161, which will be described later, of the storing unit 58 and sends them to the client apparatus 11 via the communication unit 59 and the network 21 (see steps S201, S221, and S222 of FIG. 14, which will be described later).

Further, for example, when data of various images such as a resultant image of the cut-out processing is sent from the client apparatus 11, the communication control unit 151 causes the communication unit 59 to receive the data of various images via the network 21, and causes an image storing unit 162, which will be described later, of the storing unit 58 to store it.

After that, a foreground cut out from the original image by means of the cut-out processing and a new background, which is different from the original image, are combined based on the image data stored in the image storing unit 162 and a composite image acquired as a result thereof is printed out on a medium such as paper by the printer, for example.

When the client apparatus 11 collaborates with the server 12, with which the client apparatus 11 is connected via the network 21, to carry out the cut-out processing, the main control unit 152 controls the entire server 12.

A detailed description of the control by the main control unit 152 will be described later with reference to FIG. 14 and the like.

In the present embodiment, the communication control unit 151 and the main control unit 152 are constituted as a combination of the CPU 51 as hardware and programs as software, from among the constituent elements shown in FIG. 3.

However, this is an example, and at least a part of the functions of the communication control unit 151 and the main control unit 152 can clearly be transferred to a constituent element other than the CPU 51.

In the present embodiment, the program storing unit 161 and the image storing unit 162 are provided as a storage area of the storing unit 58.

The program storing unit 161 stores in advance programs to implement the communication control unit 151 and the main control unit 152. Furthermore, as described above, the program storing unit 161 stores in advance the programs for cut-out processing downloadable by the client apparatus 11.

As described above, the image storing unit 162 stores data of various images sent from the client apparatus 11 and received by the communication unit 59 in a predetermined file format. More specific examples of possible image data, which may be stored in the image storing unit 162, will be described later.

Providing the program storing unit 161 and the image storing unit 162 as a storage area of the storing unit 58 is only an example. For example, the program storing unit 161 and the image storing unit 162 may be provided as a storage area of the removable media 61. Furthermore, the image storing unit 162 does not need to be provided in the server 12, and may be provided in any other device connected via the communication unit 59 and the network 21, for example.

In the following, a detailed description will be given of the cut-out processing carried out by the image processing system having the functional configuration of FIG. 4.

First, a detailed description will be given of the cut-out designation processing from the cut-out processing with reference to FIGS. 5 to 9.

Figure 5:
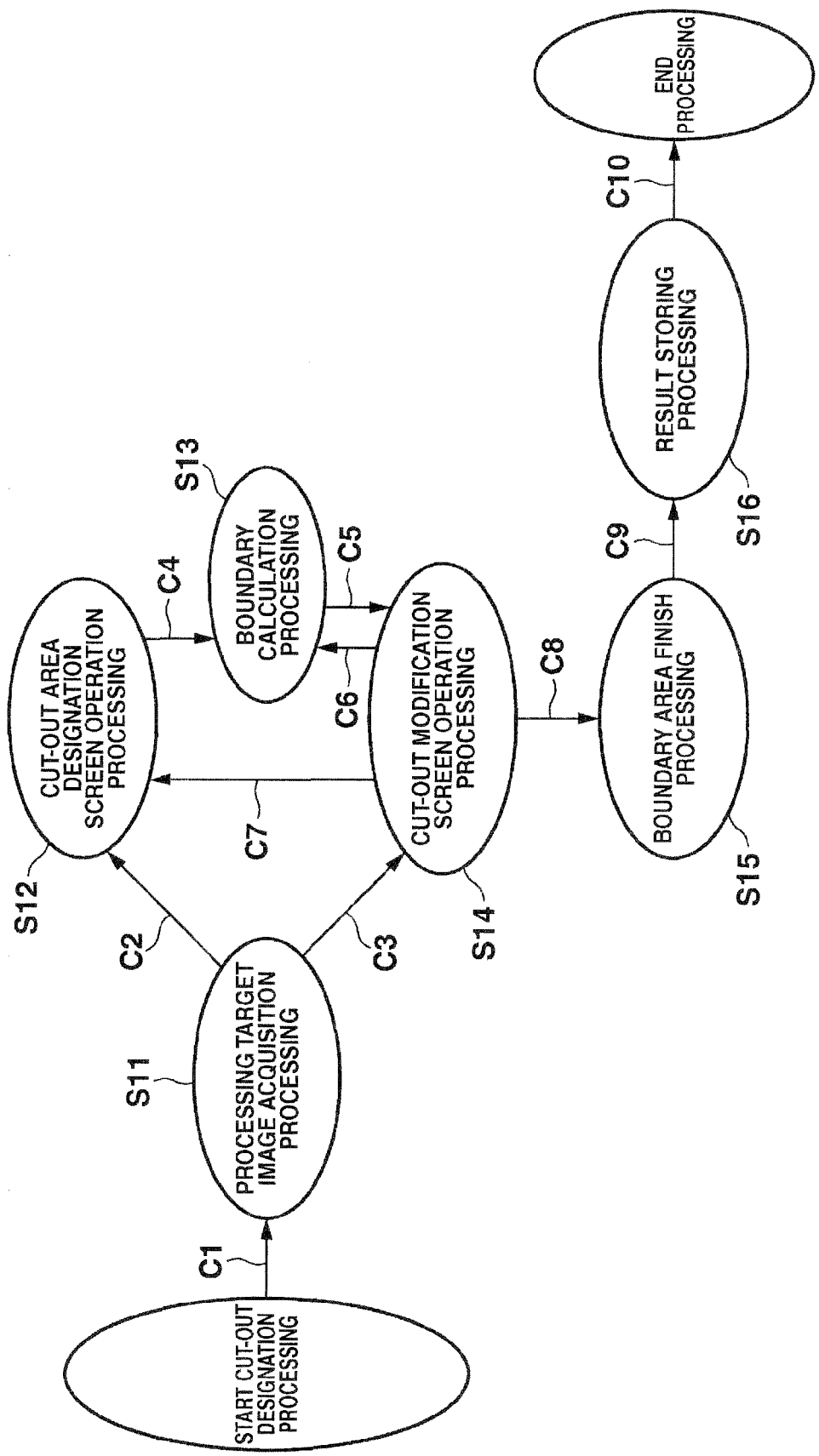
FIG. 5 is a state transition diagram showing one example of possible states and state transitions when the client apparatus shown in FIG. 4 carries out cut-out designation processing.

FIG. 5 is a state transition diagram showing one example of possible states and state transitions when the client apparatus 11 carries out the cut-out designation processing.

In FIG. 5, each state is shown as an ellipse and is distinguished by a reference symbol starting with "S" noted for the ellipse in question.

A state transition from a state to another state (including a case of staying in the same state) occurs when a predetermined condition (hereinafter, referred to as a "state transition condition") is satisfied.

In FIG. 5, such a state transition condition is shown by a reference symbol starting with "C" attached to an arrow indicating a transition from one state to another.

The same also applies to the state transition diagram of FIG. 10, which will be described later.

As a premise, in the present embodiment, it is assumed that data of a processing target image is read in advance from the image storing unit 132 before the cut-out designation processing starts.

Data of an image that includes the foreground (such as a person) to be cut-out is selected by the user from the data of a plurality of images stored in the image storing unit 132 before the cut-out processing (or the cut-out designation processing), which will be described later in detail with reference to the flowchart of FIG. 14 (see step S204 of FIG. 14).

The image data thus selected by the user is read from the image storing unit 132 as data of the processing target image and sent to the server 12 (see step S205 of FIG. 14, which will be described later). As a result thereof, the cut-out designation processing starts from the cut-out processing (see step S206 of FIG. 14 and step S241 of FIG. 15, which will be described later).

Then, the cut-out designation unit 111 (FIG. 4) determines that the state transition condition C1 is satisfied, and causes the state of the client apparatus 11 to transition to a processing target image acquisition processing state S11.

Upon transition to the processing target image acquisition processing state S11, the cut-out designation unit 111 acquires data of the processing target image.

Here, although there is no limitation to the data of the processing target image, for example, data of an image of a person captured by the image capturing unit 36 (FIG. 2) may be employed.

However, there may be a case in which a long time is needed to carry out the cut-out designation processing if the original resolution (size) of the read image data is not changed. Therefore, in the present embodiment, the cut-out designation unit 111 reduces the resolution (size) of the read image data.

Hereinafter, the resolution (size) after being reduced by the cut-out designation unit 111 is referred to as a "reduced size". For example, using a notation of "(horizontal pixel number) by (vertical pixel number) size", in the present embodiment, 640 by 480 size or 480 by 640 size is employed as the reduced size.

Here, the following two kinds of data acquired exist as data of the processing target image.

A first kind of data is data of an original image such as a captured image or the like.

Primarily, if the cut-out designation processing is performed on the processing target image data for the first time, the first kind of data, i.e., the original image data, is acquired. In this case, when the original image data is converted into data of a reduced size image, the cut-out designation unit 111 determines that the state transition condition C2 is satisfied and causes the state of the client apparatus 11 to transition to the cut-out area designation screen operation processing state S12.

On the other hand, a second kind of data is data of an image (such as a cut-out image) saved when the cut-out designation processing on the previous processing target image data has not been completed.

When the second kind of data is acquired and converted into reduced size image data as appropriate, the cut-out designation unit 111 determines that the state transition condition C3 is satisfied and causes the state of the client apparatus 11 to transition to the cut-out modification screen operation processing state S14.

In this manner, the processing target image acquisition processing state S11 transitions into the cut-out area designation screen operation processing state S12 or the cut-out modification screen operation processing state S14.

Here, the "cut-out area designation screen operation processing state" is intended to mean a state of executing processing carried out in accordance with a GUI (Graphical User Interface) operation by the user on a GUI screen named "cut-out area designation screen" displayed on the display unit 38 (FIGS. 2 and 4) of the client apparatus 11.

Accordingly, by carrying out a GUI operation using a mouse or the like of the operation unit 37 (FIGS. 2 and 4), in the cut-out area designation screen, the user can interactively give to the client apparatus 11 various kinds of instructions necessary to execute the cut-out processing.

The description in this paragraph also applies to the other screen operation processing states such as the cut-out modification screen operation processing state in the cut-out processing.

There are plural kinds of screens for use in the cut-out processing, and a different kind of screen is displayed on the display unit 38 for each state of the client apparatus 11.

Figure 6:
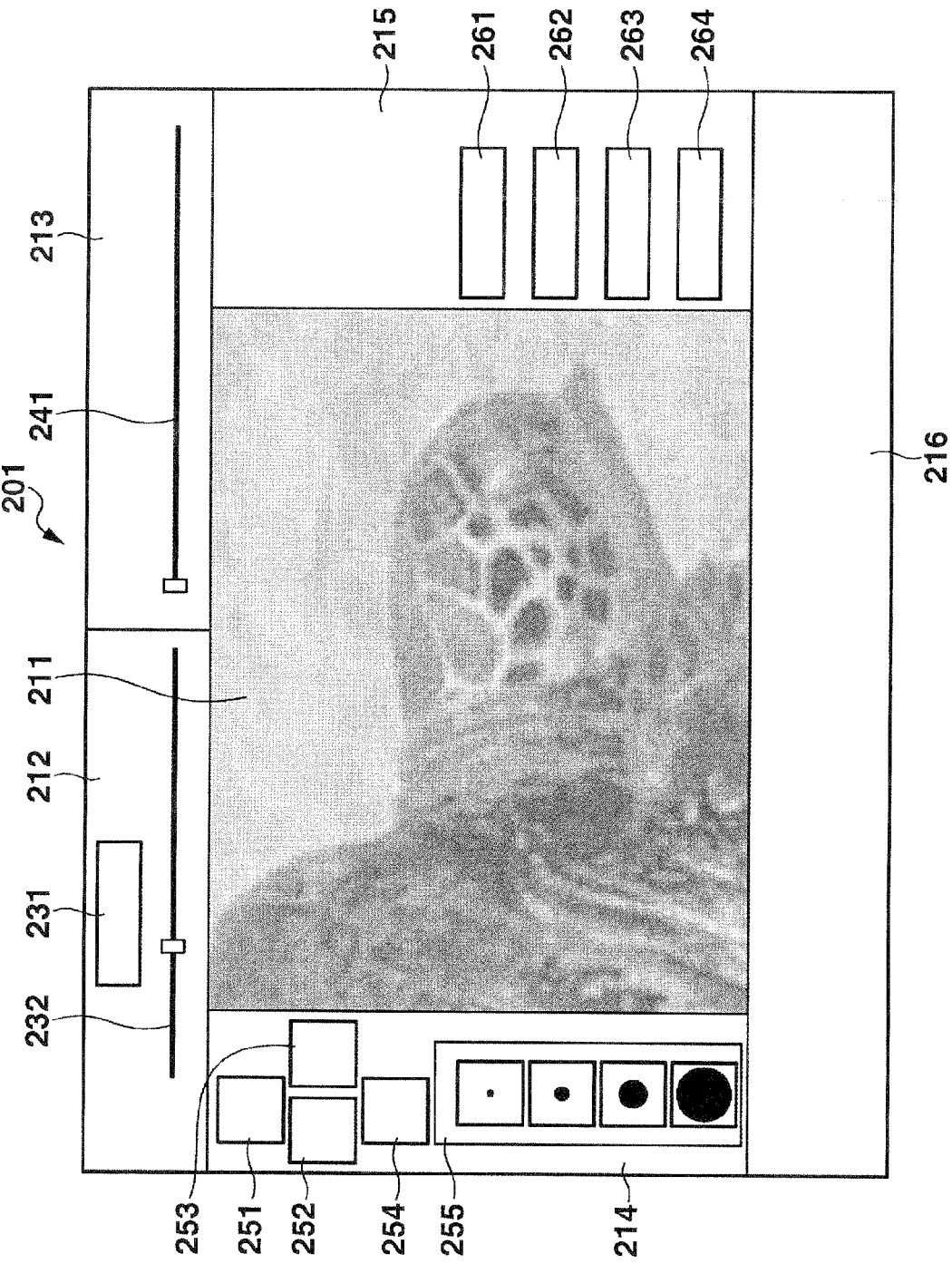
FIG. 6 is a diagram showing one example of a base screen for use in the cut-out processing of the image processing system shown in FIG. 4.

However, all the plural kinds of screens for use in the cut-out processing are generated based on a base screen such as shown in FIG. 6. This means that, for example, a predetermined kind of screen is generated in such a manner that, from among the elements (such as a software button or a slider) constituting the base screen, an element (for example, a reposition icon, which will be described later), which cannot be used or which has been already selected and thus need not be selected, is not displayed in a state in which the predetermined kind of screen is displayed.

FIG. 6 shows one example of a base screen for use in the cut-out processing.

The base screen 201 is divided into 6 display areas 211 to 216.

The display area 211 is located approximately at the center of the base screen 201 and displays a part of the processing target image, which is supposed to be operated by a user.

The display area 212 contains, for example, a software button 231 (hereinafter, referred to as a "change color button 231") that reads "change color". A function of instructing to change colors of the boundary area and a background area (non-select area, which will be described later) on the outside of the boundary area is assigned to the change color button 231.

Furthermore, for example, a software button 351 (hereinafter, referred to as "change background button 351") that reads "change background" may be placed at the same position in the display area 212, which is not illustrated in FIG. 6 (see FIG. 12). A function of instructing a display change or the like in the background is assigned to the change background button 351.

The user can press down the change color button 231 and the change background button 351 using the mouse or the like of the operation unit 37 to issue the instructions assigned thereto. Such instructions of various kinds will be described in detail later.

The display area 212 further contains a slider 232 (hereinafter, referred to as a "change transparency slider 232") that reads "transparency" on the left side thereof. The change transparency slider 232 is a slider to change the transparency of the boundary area and the background area (non-select area, which will be described later) on the outside of the boundary area.

Here, the slider is intended to mean a software-operated control, which emulates a slide volume control commonly used in an audio system or the like. Generally, the slider is indicated by images, which respectively emulate a handle and a groove which the handle can move along.

The slider has a function of selecting a value from within a predetermined range. One of both ends of the groove represents the minimum value, and the other the maximum value. The user can select an arbitrary value (transparency in the change transparency slider 232) within the range of the groove by dragging the handle using the mouse or the like of the operation unit 37.

In order to implement only a function of selecting an option from a plurality of options, a radio button and a list box may also be employed. However, in the present embodiment, the slider is employed so that the user can select a desired value from within a continuous value range.

The display area 213 contains a slider 241 (hereinafter, referred to as a "scaling slider 241") that reads "scaling".

The scaling slider 241 is a slider to scale an image displayed in the display area 211. In the scaling slider 241 of the present embodiment, the left end of the groove thereof corresponds to a normal scale, which is the minimum scale, and the right end of the groove thereof corresponds to a scale factor of 8, which is the maximum scale. This means that, in the present embodiment, it is impossible to select a scale less than the normal scale. When the handle is dragged to the left end of the groove, the display area 211 is displayed in the normal scale. Here, "displayed in normal scale" is intended to mean a state in which the entire image to be edited (processing target image) is displayed in the entire display area 211.

The display area 214 contains drawing tools.

The drawing tools are tools allowing the user to click on an icon such as a pen using the mouse or the like of the operation unit 37 to change the behavior of mouse operations with respect to the display area 211. The number and kinds of elements constituting the drawing tools are not particularly limited. In the present embodiment, however, a reposition icon 251, a background pen 252, a boundary pen 253, an eraser 254, and a pen size options box 255 are placed in the display area 214, as shown in FIG. 6.

The reposition icon 251 is an icon to enable a function to allow a user, when an image is displayed as being enlarged, to change (reposition) the displayed part thereof by way of a mouse drag using the mouse or the like of the operation unit 37.

The background pen 252 is a software pen used to specify the background.

The boundary pen 253 is a software pen used to specify the boundary between the foreground and the background.

The eraser 254 is a tool used to erase an area drawn with the boundary pen 253 in the cut-out area designation screen (see FIG. 7, which will be described later) or to specify the select area (foreground area to be cut out) in the screens other than the cut-out area designation screen.

The pen size options box 255 is a group of icons used to select the draw size of the background pen 252, the boundary pen 253, and the eraser 254. The user can change the draw size by clicking on the icon representing a desired size from within the pen size options box 255 using the mouse or the like of the operation unit 37.

In the present embodiment, the setting of the pen size options box 255 (draw size) is reset to the default value, in a case in which the focused screen is switched. In a case in which the boundary calculation (including the case accompanied by the matte processing) is performed, the setting of the pen size options box 255 (draw size) is maintained. In a case in which the screen is scaled, the setting of the pen size options box 255 (draw size) is changed in proportion to the screen scale.

The display area 215 contains various software buttons such as software buttons 261 to 264.

Since diverse software buttons are disposed in the display area 215 depending on the kind of screen, descriptions of such buttons will be given later along with the description of each kind of screen. Incidentally, the software buttons 261 to 264 shown in FIG. 6 are used in the finishing area designation screen, which will be described later.

The display area 216 is provided as an auxiliary area, where various images such as an image of a message are displayed as appropriate.

In the following, a description will be given of a screen displayed in the cut-out area designation screen operation processing state S12 of FIG. 5, i.e., the cut-out area designation screen, from among the screens generated based on the base screen 201 shown in FIG. 6.

Figure 7:
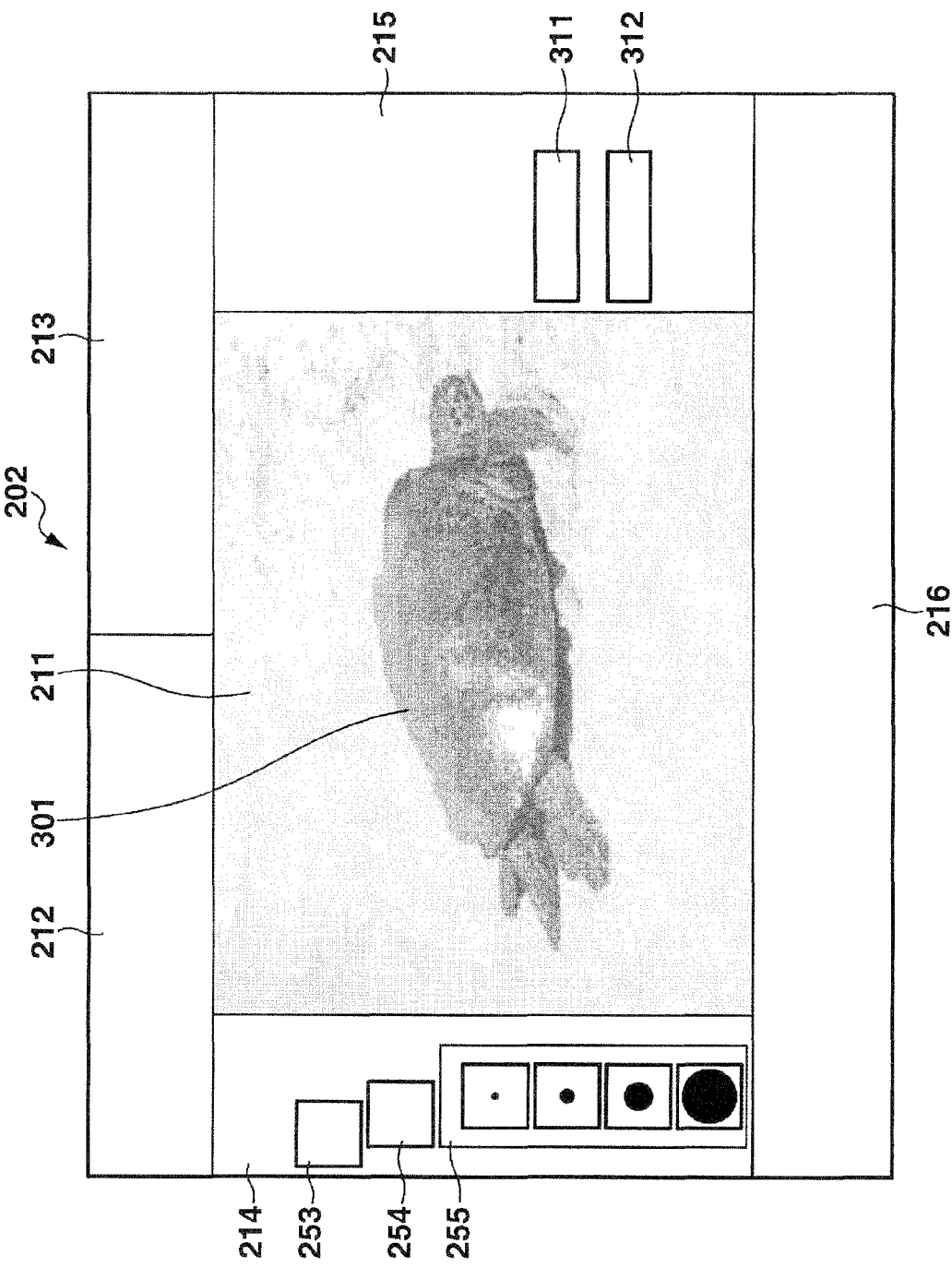
FIG. 7 is a diagram showing one example of a cut-out area designation screen for use in the cut-out designation processing shown in FIG. 5.

FIG. 7 shows one example of the cut-out area designation screen.

The cut-out area designation screen 202 is divided into 6 display areas 211 to 216, similarly to the base screen 201 (FIG. 6).

However, the display areas 212, 213, and 216 of the cut-out area designation screen 202 have no display content.

The display area 211 displays, as an initial state, an entire processing target image such as a captured image (though in a reduced size).

The display area 214 displays a boundary pen 253, an eraser 254, and a pen size options box 255 from among the drawing tools.

The user circumscribes, and thus, specifies a boundary area between a foreground and a background of the processing target image displayed in the display area 211 using the boundary pen 253 by moving the mouse or the like of the operation unit 37. At this time, the boundary area specified by the user is displayed in the display area 211 by the draw size selected in the pen size options box 255. For example, in FIG. 7, since the boundary area between the foreground (sea turtle) and the background is in the process of being circumscribed, a partial area 301 corresponding to the already specified part is displayed as the boundary area.

When the user has specified a wrong area while specifying a boundary area using the boundary pen 253, the user can erase the wrong area, using the eraser 254, from within the boundary area displayed in the display area 211.

To change the draw size of the boundary pen 253 and the eraser 254, the user may select an appropriate draw size from the pen size options box 255.

The display area 215 of the cut-out area designation screen 202 contains a software button 311 (hereinafter, referred to as an "undo button 311") that reads "undo" and a software button 312 (hereinafter, referred to as a "boundary calculation button 312") that reads "boundary calculation".

A function of undoing the previous operation is assigned to the undo button 311.

In cases such as when the content of the previous operation has been mistakenly done, the user can undo the previous operation by pressing down the undo button 311 using the mouse or the like of the operation unit 37.

A function of instructing that the boundary calculation be started is assigned to the boundary calculation button 312.

After the operation of specifying the boundary area, the user can instruct that the boundary calculation on the boundary area be started by pressing down the boundary calculation button 312 using the mouse or the like of the operation unit 37.

When the boundary calculation button 312 is pressed down, the cut-out designation unit 111 (FIG. 4) determines that the state transition condition C4 is satisfied and causes the state of the client apparatus 11 to transition to the boundary calculation processing state S13, as shown in FIG. 5.

Upon transition to the boundary calculation processing state S13, the cut-out designation unit 111 performs the boundary calculation on the boundary area specified by the user based on the data of the processing target image (of the reduced size).

More specifically, in the present embodiment, the cut-out designation unit 111 executes the following series of processes and thereby performs the boundary calculation.

Based on the data of the processing target image, the cut-out designation unit 111 determines the area on the inside of the boundary area specified by the user as an area (hereinafter, referred to as an "absolute foreground area") absolutely certain to be the foreground, and the area on the outside of the boundary area as an area (hereinafter, referred to as an "absolute background area") absolutely certain to be the background.

Then, the cut-out designation unit 111 models a cost function that evaluates the adequacy of a binary label representing a foreground or background for each pixel constituting the processing target image (of the reduced size) using a first order MRF (Markov Random Field) model, and acquires the optimum solution thereof.

More specifically, the cut-out designation unit 111 models a data term of the cost function using the information of the absolute foreground area and the absolute background area, and the neighbor term of the cost function using gaps between neighboring pixels of the processing target image.

As a result of this, an optimized binary label image of a reduced size is acquired, and the cut-out designation unit 111 stores the binary label image data in the image storing unit 132 (FIG. 4) of the storing unit 39, or the like.

In this manner, in the present embodiment, the cut-out designation unit 111 executes the boundary calculation.

When such a boundary calculation is terminated, as shown in FIG. 5, the cut-out designation unit 111 (FIG. 4) determines that the state transition condition C5 is satisfied and causes the state of the client apparatus 11 to transition to the cut-out modification screen operation processing state S14.

Although not illustrated in FIG. 5, in a case in which the boundary calculation has failed due to a flaw (such as that the boundary area is not closed) in the boundary area specified by the boundary pen 253, the cut-out designation unit 111 displays an image of a message showing the failure in the boundary calculation on the display unit 38 and maintains the cut-out area designation screen operation processing state S12.

Figure 8:
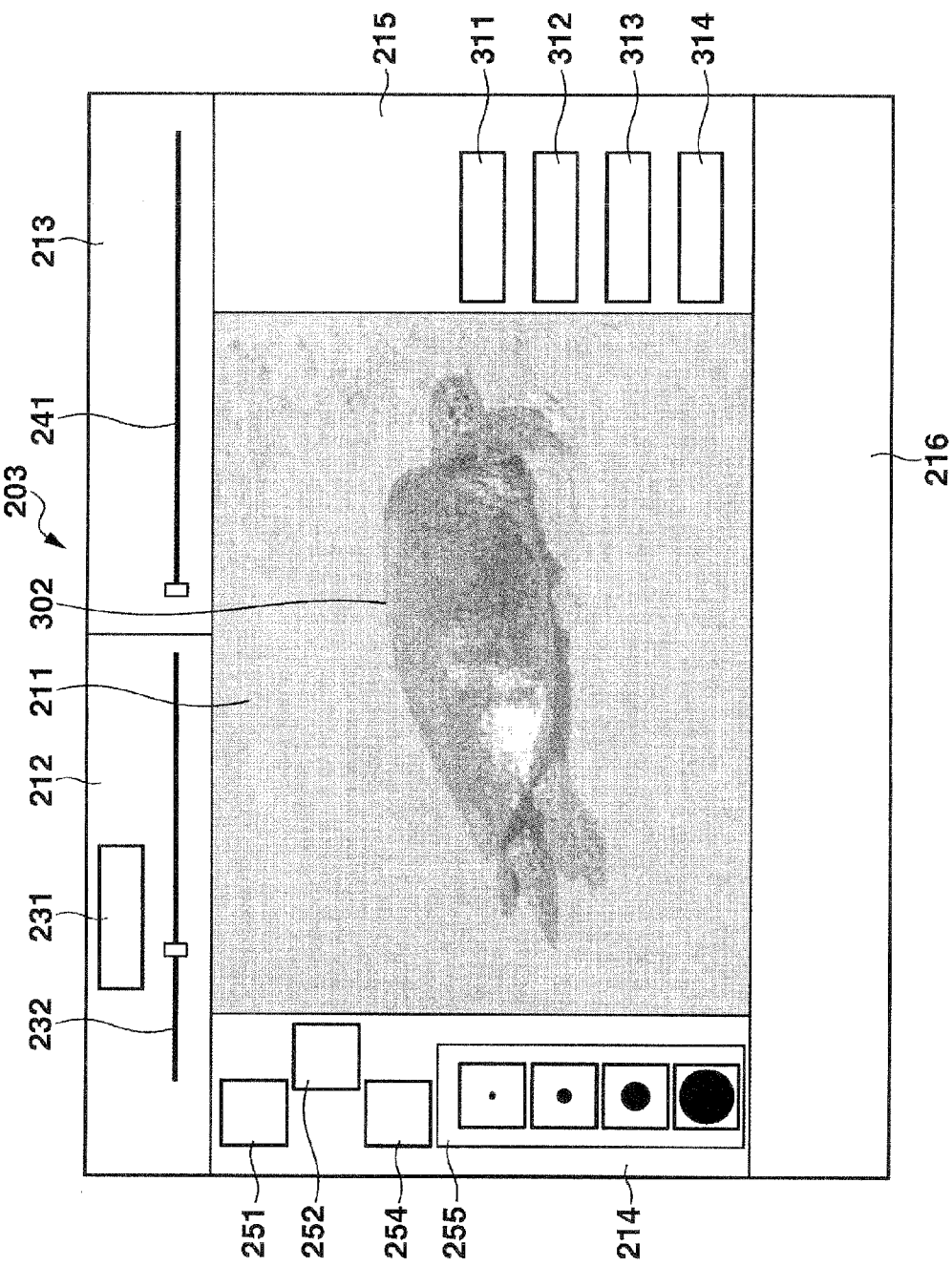
FIG. 8 is a diagram showing one example of a cut-out modification screen for use in the cut-out designation processing shown in FIG. 5.

Upon transition to the cut-out modification screen operation processing state S14, the cut-out designation unit 111 displays a cut-out modification screen shown in FIG. 8 on the display unit 38.

FIG. 8 shows one example of the cut-out modification screen.

The cut-out modification screen 203 is divided into 6 display areas 211 to 216, similarly to the base screen 201 (FIG. 6).

The display area 211 displays, as an initial state, the result of the above-described boundary calculation performed by pressing down the boundary calculation button 312 of the cut-out area designation screen 202 of FIG. 7 described above.

This means that the display area 211 displays a composite image, in which the binary label image (of a reduced size) is superimposed on the processing target image (of a reduced size), along with the boundary area (the area 302 surrounding the sea turtle in the example of FIG. 8) between the foreground and the background.

Here, the area on the inside of the boundary area is the foreground area selected by the user to be cut out, i.e., the select area. In the select area, the transparency rate is fixed to 100%, and therefore the select area always displays the processing target image as it is.

The cut-out modification screen 203 is a screen allowing a user to modify the select area using the mouse or the like of the operation unit 37.

The display area 212 contains a change color button 231 and a change transparency slider 232.

Here, the area on the outside of the boundary area (the area 302 surrounding the sea turtle in the example of FIG. 8), i.e., the background area that has not been selected by the user to be cut out is hereinafter referred to as a "non-select area". Thus, the image displayed in the display area 211 of the cut-out modification screen 203 is classified into the select area as the foreground, the non-select area as the background, and the boundary area therebetween.

In order for the user to view and recognize such classification, in the present embodiment, the boundary area and the non-select area are displayed in a first color and a second color, respectively. Hereinafter, the first color to display the boundary area is referred to as a "boundary color", and the second color to display the non-select area as the background is referred to as a "background color".

In the initial state of the present embodiment, the combination of the boundary and background colors is assumed to be a combination of red and blue. However, any colors may be used as long as the colors can make the areas distinguishable from each other. Each of the boundary and background colors is changeable by means of the change color button 231. This means that the user can change the combination of the boundary and background colors to a desired color combination by pressing down the change color button 231. A detailed description will be given later of the color combination change with reference to FIG. 25.

Furthermore, in the initial state of the present embodiment, the boundary and non-select areas are semi-transparent. However, it is possible to change the transparency by means of the change transparency slider 232. The non-select area in the upper layer of the binary label image is displayed in the background color. The higher the transparency thereof becomes, the more the user can view and recognize the background elements in the lower layer of the processing target image. The same applies to the transparency in the boundary area.

The user can change the transparency of the boundary area and the non-select area to a desired ratio by operating the change transparency slider 232.

The display area 213 contains a scaling slider 241.

Therefore, the user can enlarge a partial area of interest such as a desired area or an intersection of 2 or more areas among the select area, the boundary area, and the non-select area by operating the scaling slider 241. After that, the user can reduce the scale of the enlarged image within a range down to the normal scale by operating the scaling slider 241.

The display area 214 displays a reposition icon 251, a background pen 252, an eraser 254, and a pen size options box 255 from among the drawing tools.

The user can specify an area, which should belong to the foreground but happens to belong to the background, within the image displayed in the display area 211, and erase the area with the eraser 254, using the mouse or the like of the operation unit 37, and thereby newly specify the area as the select area.

On the other hand, the user can specify an area, which should belong to the background but happens to belong to the foreground, within the image displayed in the display area 211, in such a manner as to draw the area with the background pen 252 using the mouse or the like of the operation unit 37, and thereby specify the area as the non-select area.

This means that, since the non-select area is displayed in the display area 211 in the second color, the user can modify the select area visually recognizing that the colored area is an area to be cut off when the select area (foreground) is cut out.

In a case in which an enlarged image is displayed in the display area 211, the user can change (reposition) a displayed part thereof (part to be worked) with the reposition icon 251. If the user desires to change the draw size of the background pen 252 and the eraser 254, the user may set the pen size options box 255.

The display area 215 of the cut-out modification screen 203 contains an undo button 311 and a boundary calculation button 312, similarly to the cut-out area designation screen 202. The display area 215 further contains a software button 313 (hereinafter, referred to as an "area designation button 313") that reads "area designation" and a software button 314 (hereinafter, referred to as a "save button 314") that reads "save".

In cases such as when the content of the previous operation has been mistakenly done or the like, the user can undo the previous operation by pressing down the undo button 311 using the mouse or the like of the operation unit 37.

Also, the user may instruct that recalculation of the boundary calculation be started by pressing down the boundary calculation button 312 again using the mouse or the like of the operation unit 37 after the select area has been modified.

When the boundary calculation button 312 of the cut-out modification screen 203 is pressed down, the cut-out designation unit 111 (FIG. 4) determines that the state transition condition C6 is satisfied and causes the state of the client apparatus 11 to transition again to the boundary calculation processing state S13, as shown in FIG. 5.

Upon transition again to the boundary calculation processing state S13, the cut-out designation unit 111 performs recalculation of the boundary calculation on the select area modified by the user based on the data of the processing target image (of the reduced size).

When the recalculation of the boundary calculation is complete, as shown in FIG. 5, the cut-out designation unit 111 determines that the state transition condition C5 is satisfied again and causes the state of the client apparatus 11 to transition again to the cut-out modification screen operation processing state S14.

Upon transition to the cut-out modification screen operation processing state S14 again, the cut-out designation unit 111 displays the cut-out modification screen 203 on the display unit 38. In this case, the display area 211 displays an image showing the recalculation result of the boundary calculation.

Here, the boundary calculation button 312 may be pressed down any number of times. This means that the number of times of pressing down the boundary calculation button 312 is not limited. Accordingly, the user may repeat the series of operations of modifying the select area, pressing down the boundary calculation button 312, and confirming the result of modification by viewing the recalculation result of the boundary calculation displayed in the display area 211, as many as the user likes to perform.

In a case in which a desired select area is not acquired even by repeating the aforementioned series of operations, it is possible for the user to start over again from the operation of specifying the boundary area.

In this case, the user may press down the area designation button 313.

Then, as shown in FIG. 5, it is determined that the state transition condition C7 is satisfied, the state of the client apparatus 11 transitions again to the cut-out area designation screen operation processing state S12, and the cut-out area designation screen 202 shown in FIG. 7 is displayed again.

In this manner, the user can perform the GUI operation on the cut-out area designation screen 202 again.

On the other hand, in a case in which a desired select area is acquired by repeating the series of operations, the user may press down the save button 314 of the cut-out modification screen 203 of FIG. 8 to save the result of the cut-out designation processing.

Then, as shown in FIG. 5, it is determined that the state transition condition C8 is satisfied, and the state of the client apparatus 11 transitions into the boundary area finish processing state S15.

Upon transition to the boundary area finish processing state S15, the cut-out designation unit 111 executes the boundary area finish processing.

As a result thereof, it is determined that the state transition condition C9 is satisfied, and the state of the client apparatus 11 transitions into the result storing processing state S16. Upon transition to the result storing processing state S16, the cut-out designation unit 111 generates a file including at least data of the processing target image (in the original size) and the data of the binary label image (in the reduced size) acquired by the boundary calculation and stores the file in the image storing unit 132 of the storing unit 39.

Hereinafter, such a file is referred to as a "cut-out designation processing result file".

In a case in which the save button 314 is pressed down without pressing down the boundary calculation button 312 (without executing the boundary calculation) after the cut-out modification screen 203 is modified by the background pen 252 or the eraser 254, as a result of the GUI operations on the cut-out modification screen 203 of FIG. 8, the cut-out designation unit 111 does not execute the boundary calculation, but generates data of a binary label image having the select area and the non-select area, in which the last made modifications have been reflected, and includes the data in the cut-out designation processing result file.

When the cut-out designation processing result file is thus stored in the storing unit 39, as shown in FIG. 5, it is determined that the state transition condition C10 is satisfied, and the cut-out designation processing ends.

In the following, for further understanding of the operation at the time of cut-out designation processing, a description will be given of a series of processing (hereinafter, referred to as "cut-out area modification processing") from a transition to the cut-out modification screen operation processing state S14, of various user operations on the cut-out modification screen 203 of FIG. 8, up to the operation of storing the resultant data of the cut-out modification in the storing unit 39.

Figure 9:
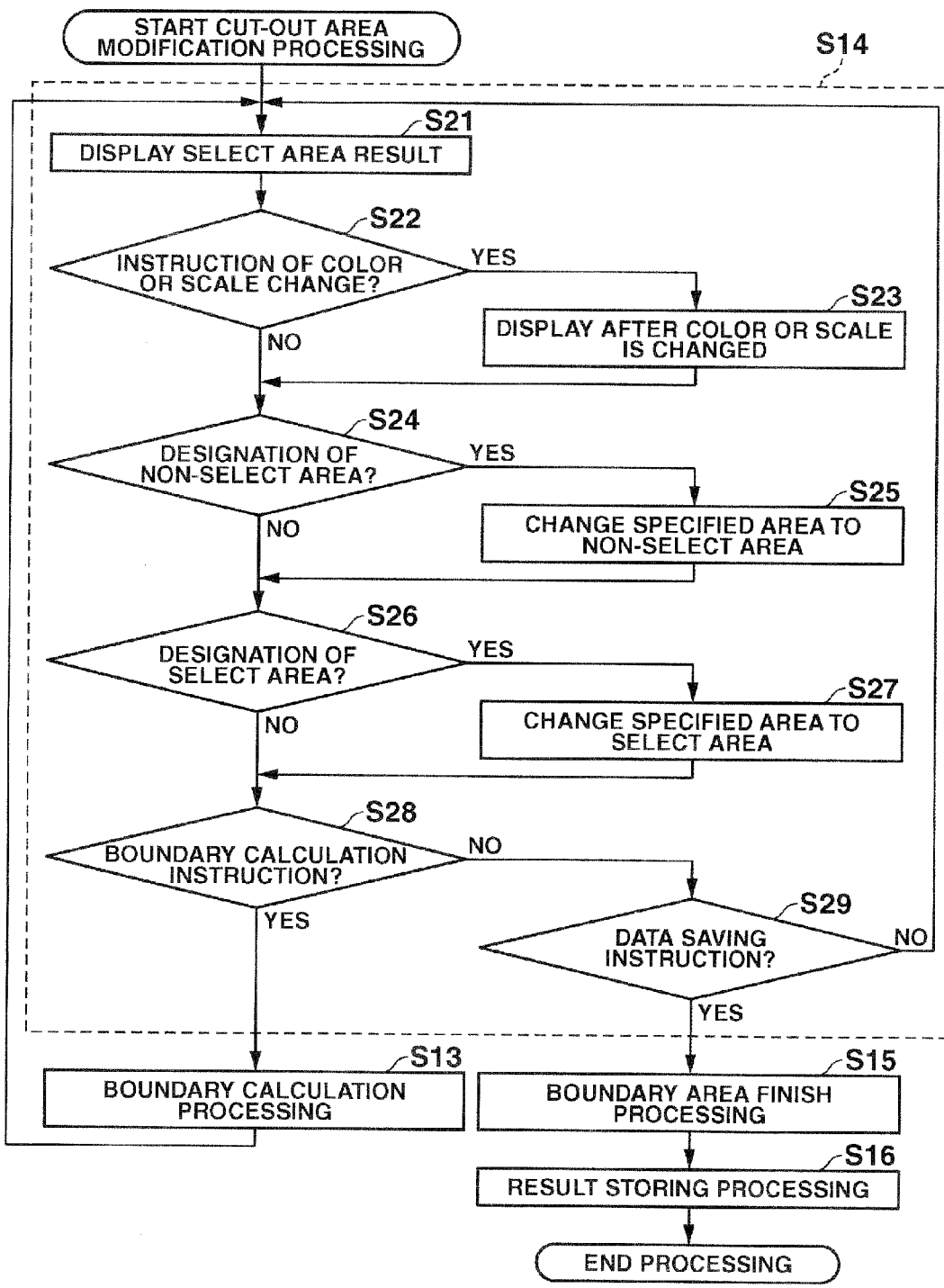
FIG. 9 is a flowchart showing flow of cut-out area modification processing that corresponds to a part of the cut-out designation processing shown in FIG. 5.

FIG. 9 is a flowchart showing flow of the cut-out area modification processing.

As is evident from the comparison between FIGS. 5 and 9, the cut-out area modification processing of FIG. 9 is a flowchart of a part of the state transitions from the boundary calculation processing state S13 to the result storing processing state S16 of FIG. 5.

In the cut-out area designation screen operation processing state S12 of FIG. 5, when the boundary calculation button 312 of the cut-out area designation screen 202 (FIG. 7) is pressed down, the boundary calculation is performed in the boundary calculation processing state S13, the state transition condition C5 is satisfied, and the state of the client apparatus 11 transitions into the cut-out modification screen operation processing state S14. Then, the cut-out modification screen 203 (FIG. 8) is displayed, and the following cut-out area modification processing is executed.

In step S21, the cut-out designation unit 111 displays an image (hereinafter, referred to as a "display image") indicating the result of the select area (the result of the boundary calculation based on the operation on the cut-out area designation screen 202) in the display area 211 of the cut-out modification screen 203.

Here, in the display image of the present embodiment, as described above, it is assumed that the non-select area (background area) is displayed in blue and the boundary area (the area 302 surrounding the sea turtle in the example of FIG. 8) is displayed in red. Also, as described above, the non-select area and the boundary area are semi-transparent as the initial state.

This means that the cut-out modification screen 203 of the present embodiment is displayed in a form so that the user can operate with an image that a colored area is an area to be cut off.

In step S22, the cut-out designation unit 111 determines whether or not there has been an instruction to change color or scale.

If there has been an instruction to change color or scale, a determination of YES is made in step S22, and control proceeds to step S23.

In step S23, the cut-out designation unit 111 changes scale or color of the display image in the display area 211.

More specifically, for example, when the change color button 231 is pressed down, it is determined that there has been an instruction to change color, i.e., a determination of YES is made in the process of step S22, and the combination of the boundary color and the background color is changed in the process of step S23.

Further, for example, when the scaling slider 241 is operated, it is determined that there has been an instruction to change scale, i.e., a determination of YES is made in the process of step S22, and the display image is enlarged or reduced in scale in the process of step S23.

When such a process of step S23 is terminated, control proceeds to step S24.

On the other hand, if there has been no instruction to change color or scale, a determination of NO is made in step S22, and control proceeds to step S24 without executing the process of step S23, i.e., without changing the display of the display area 211.

In step S24, the cut-out designation unit 111 determines whether or not there has been a designation of the non-select area.

As described above, the user may specify an area, which should belong to the background but happens to belong to the foreground, within the image displayed in the display area 211, in a manner such as to draw the area with the background pen 252 using the mouse or the like of the operation unit 37, and thereby specify the area as the non-select area.

If there has been such a designation, a determination of YES is made in step S24, and control proceeds to step S25.

In step S25, the cut-out designation unit 111 changes the specified area to belong to the non-select area. In this case, in the display image of the display area 211, the area changed to belong to the non-select area is displayed in the background color.

When the process of step S25 ends, control proceeds to step S26.

On the other hand, if there has been no designation of the non-select area, a determination of NO is made in step S24, and control proceeds to step S26 without executing the process of step S25, i.e., without changing the non-select area.

In step S26, the cut-out designation unit 111 determines whether or not there has been a designation of the select area.

As described above, the user can specify an area, which should be in the foreground but happens to be in the background, in such a manner so as to erase the area with the eraser 254 within the display image of the display area 211 using the mouse or the like of the operation unit 37, and thereby newly specify the area to belong to the select area.

If there has been such a designation, a determination of YES is made in step S26, and control proceeds to step S27.

In step S27, the cut-out designation unit 111 changes the specified area to belong to the select area. In this case, in the display image of the display area 211, a corresponding area of the original image is displayed in the area changed to belong to the select area.

When the process of step S27 ends, control proceeds to step S28.

On the other hand, if there has been no designation of the select area, a determination of NO is made in step S26, and control proceeds to step S28 without executing the process of step S27, i.e., without changing the select area.

In step S28, the cut-out designation unit 111 determines whether or not there has been an instruction of boundary calculation.

As described above, after such designation operations of the select area and the non-select area, the user can instruct that recalculation of the boundary calculation be started by pressing down the boundary calculation button 312 using the mouse or the like of the operation unit 37.

If there has been such an instruction, a determination of YES is made in step S28, and control proceeds to step S13.

In step S13, the cut-out designation unit 111 executes the boundary calculation processing.

Here, the same reference symbol "S13" as the boundary calculation processing state of FIG. 5 is assigned to a step of the flowchart of FIG. 9, since the same processing is executed. This means that the determination of YES in step S28 of FIG. 9 is equivalent to the fact that the state transition condition C6 of FIG. 5 is satisfied.

Also, the completion of the boundary calculation processing in step S13 of FIG. 9 is equivalent to the fact that the state transition condition C5 of FIG. 5 is satisfied. Accordingly, control goes back to step S21 in FIG. 9, and the processes thereafter are repeated, similarly to the transition back to the cut-out modification screen operation processing state S14 of FIG. 5.

On the other hand, if such boundary calculation processing is not necessary, the boundary calculation button 312 is not pressed down. Therefore, a determination of NO is made in step S28, and control proceeds to step S29.

In step S29, the cut-out designation unit 111 determines whether or not there has been an instruction to save data.

As described above, the instruction to save data is issued by pressing down the save button 314.

If there has been no instruction to save data, a determination of NO is made in step S29, control goes back to step S21, and the processes thereafter are repeated.

This means that, as described above, the user can repeat the designation of the select area and the non-select area as many times as the user likes, to change color or scale as appropriate, until a desired result of the select area is acquired. Finally, when a desired result of the select area is acquired, the user may press down the save button 314.

When the save button 314 is pressed down, a determination of YES is made in step S29, and control proceeds to step S15.

Here, the same reference symbol "S15" as the boundary area finish processing state of FIG. 5 is assigned to a step of the flowchart of FIG. 9, since the same processing is executed. This means that the determination of YES in step S29 of FIG. 9 is equivalent to the fact that the state transition condition C8 of FIG. 5 is satisfied.

Also, the completion of the boundary area finish processing in step S15 of FIG. 9 is equivalent to the fact that the state transition condition C9 of FIG. 5 is satisfied. Accordingly, control proceeds to step S16, similarly to the transition to the result storing processing state S16 of FIG. 5. Here, the same reference symbol "S16" as the result storing processing state of FIG. 5 is assigned to a step of the flowchart of FIG. 9, since the same processing is executed.

Therefore, when the cut-out designation processing result file is stored in the storing unit 39 by the result storing processing of step S16, the cut-out area designation processing ends, similarly to the result of the determination that the state transition condition C10 of FIG. 5 is satisfied.

In the above, a detailed description has been given of the cut-out designation processing from the cut-out processing carried out by the image processing system having the functional configuration of FIG. 4 with reference to FIGS. 5 to 9.

In the following, a detailed description will be given of the finish adjustment processing from the cut-out processing with reference to FIGS. 10 to 13.

Figure 10:
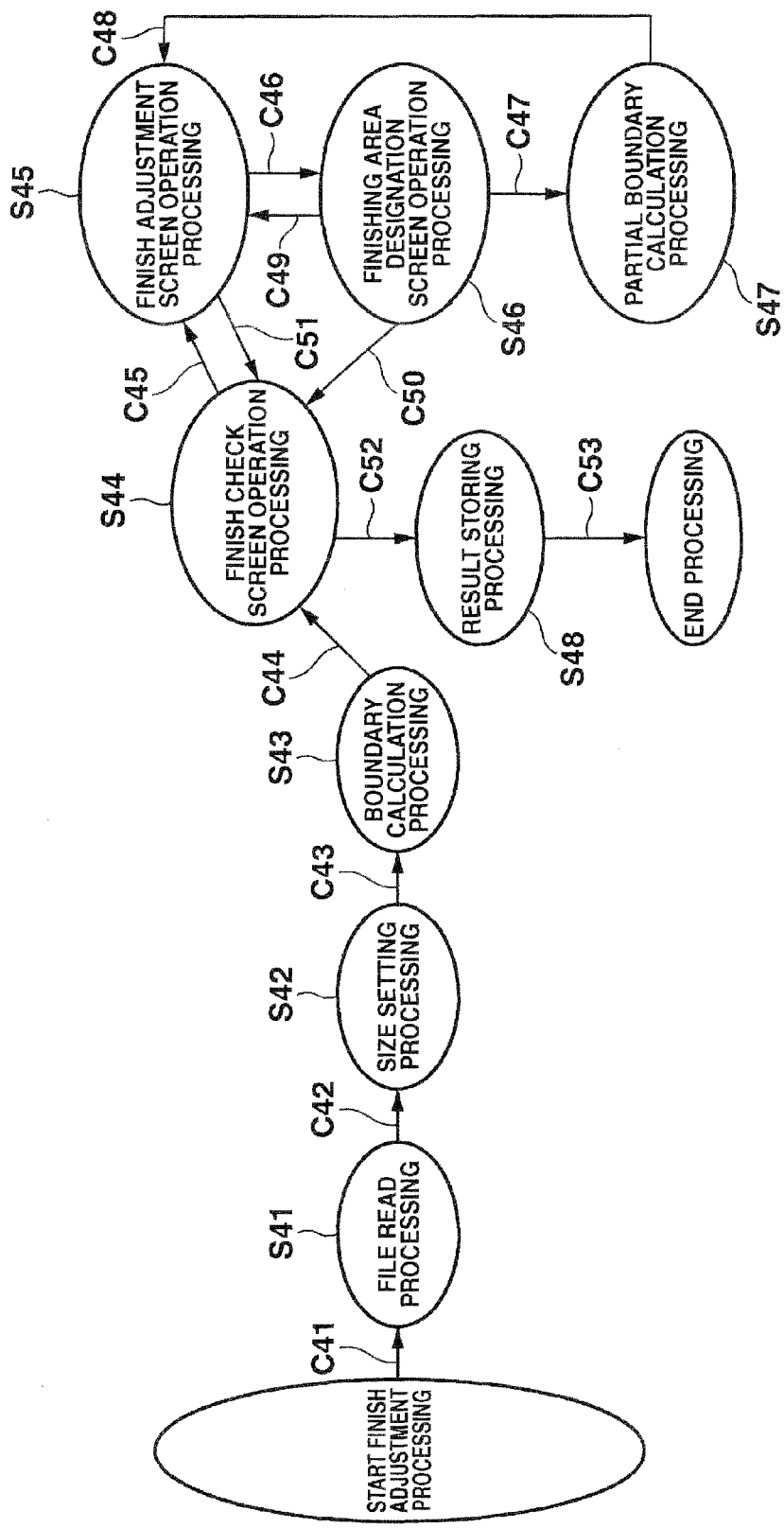
FIG. 10 is a state transition diagram showing one example of possible states and state transitions when the client apparatus shown in FIG. 4 carries out finish adjustment processing.

FIG. 10 is a state transition diagram showing one example of possible states and state transitions when the client apparatus 11 carries out the finish adjustment processing.

The finish adjustment processing is executed after the cut-out designation processing. By using the cut-out designation processing result file, it is also possible to cut out a foreground from a processing target image and combine the foreground with another background. However, there may be a user who desires to finish the boundary area with high accuracy or to finish the image in higher resolution. The finish adjustment processing is executed for such a user.

The instruction to start the finish adjustment processing is given by a predetermined operation of the operation unit 37.

Upon receiving such an instruction, the finish adjustment unit 112 (FIG. 4) determines that the state transition condition C41 is satisfied and causes the state of the client apparatus 11 to transition to the file read processing state S41.

Upon transition to the file read processing state S41, the finish adjustment unit 112 reads, from the storing unit 39, the cut-out designation processing result file including the data of the processing target image.

In this manner, it is determined that the state transition condition C42 is satisfied, and the state of the client apparatus 11 transitions to the size setting processing state S42.

Upon transition to the size setting processing state S42, the finish adjustment unit 112 executes the following series of processes.

The finish adjustment unit 112 causes the display unit 38 to display a screen (not shown) to select an output size, and waits for a user to select an operation.

The user operates the operation unit 37 to select a desired size as a size of an image for the case of printing out the image.

The finish adjustment unit 112 sets a size selected by the user as an output size. In general, the output size does not exceed the original size of the processing target image such as a captured image. However, the output size is not limited to this, and any arbitrary size may be employed as the output size.

When such a series of processes is executed, it is determined that the state transition condition C43 is satisfied, and the state of the client apparatus 11 transitions into the boundary calculation processing state S43.

Upon transition to the boundary calculation processing state S43, the boundary calculation unit 121 of the finish adjustment unit 112 executes the boundary calculation processing on the cut-out designation processing result file that has been read.

In the boundary calculation processing, matte processing is executed.

In essence, the matte processing separates mixed colors at boundary pixels between the foreground and the background.

More specifically, the matte processing is processing that estimates unknowns α and F (and in some cases B also) from an observation value P by solving the following simultaneous equation (1).

$$P[x,y,c] = \alpha[x,y]F[x,y,c] + (1-\alpha[x,y])B[x,y,c] \qquad (1)$$

On the left-hand side of equation (1), $P[x,y,c]$ denotes a pixel value at a coordinate (x,y) (hereinafter, also referred to as a "pixel location (x,y)") for a color components vector c.

On the right-hand side of equation (1), α[x,y] denotes a ratio at the pixel location (x,y) varying between 0 and 1, which is referred to as "mix ratio α" or "alpha value". The mix ratio α[x,y] is a value different from one pixel to another. F[x,y,c] is a pixel value of a foreground element and is hereinafter referred to as a "foreground pixel value". B[x,y,c] is a pixel value of a background element and is hereinafter referred to as a "background pixel value".

Hereinafter, unless individual distinction of the pixel location (x,y) and the color components vector c is necessary, the notations of x, y, and c are omitted as appropriate.

Equation (1) is intended to mean that the pixel value P[x,y,c] is observed at the pixel location (x,y) in the boundary area as a result of mixing the foreground pixel value F[x,y,c] and the background pixel value B[x,y,c] at the ratio α[x,y].

Here, equation (1) is an under-constrained simultaneous equation, which is unsolvable in its own terms. However, if the possible range of the background pixel value B is specified by another means (chroma key) or an assumption, such as that the foreground pixel value F and the background pixel value B change smoothly (in a locally uniform manner), is added, then it becomes possible to solve equation (1).

Therefore, in the matte processing, the mix ratio α (alpha value) and the foreground pixel value F are estimated. If the mix ratio α (alpha value) and the foreground pixel value F are thus estimated properly by the matte processing, the pixel value P'[x,y,c] at the pixel location (x,y) of the composite image P' can be easily acquired by calculating the following equation (2) with a new background pixel value B'[x,y,c].

$$P'[x,y,c] = \alpha[x,y]F[x,y,c] + (1-\alpha[x,y])B'[x,y,c] \quad (2)$$

In an ideal case, the composite image P' thus acquired is not affected by the background pixel value B[x,y,c] of the original image (the processing target image in the present embodiment). Thus, it becomes possible to acquire a beautiful and natural result.

For more details on the matte processing, see "A Bayesian Approach to Digital Matting", 2001 (IEEE CVPR) and the like.

In the image processing system (FIG. 1) of the present embodiment, it is also assumed that the composite image P' is printed out.

In order to consider a sufficient number of pixels required for printing, the matte processing encounters a critical problem in that an immense amount of calculation is required in accordance with the number of pixels to be outputted.

Assuming that an order for a printout is received from a user, it is important that the user can accurately check the printout result before the user places the order for printout, in order to prevent any complaints from arising. Also, for business use, in order to avoid loss of market, it is important that the user can immediately modify the printout result if required. However, with recent digital still cameras and digital printers, since the number of pixels to be processed is much more than 10 million pixels, it is difficult for a personal computer (such as the client apparatus 11 of FIG. 1) or a web server (such as the server 12 of FIG. 1) to carry out the matte processing on such a number of pixels in real time.

Figure 11:
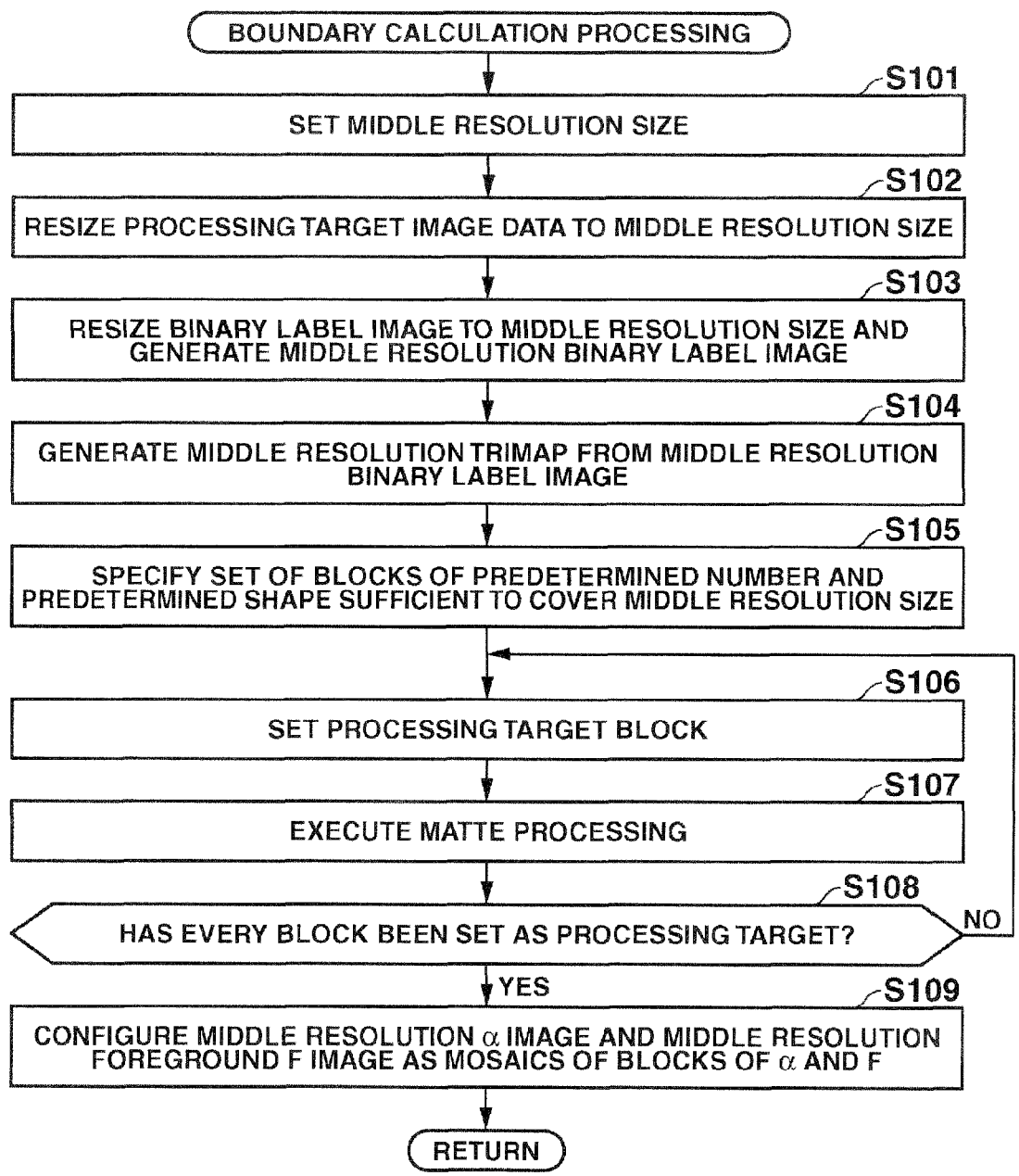
FIG. 11 is a flowchart showing flow of matte processing carried out in the finish adjustment processing shown in FIG. 10.

Therefore, in the present embodiment, the matte processing shown in FIG. 11 is carried out so as to greatly cut down the calculation amount of the matte processing.

FIG. 11 is a flowchart showing flow of the matte processing.

In step S101, the boundary calculation processing unit 121 specifies a middle resolution size.

Here, the middle resolution size is intended to mean either the output size or a predetermined size (which is assumed to be equal to or greater than the reduced size to be used for the cut-out designation processing described above), whichever is smaller.

Accordingly, the boundary calculation processing unit 121 sets a middle resolution size by comparing the output size and the predetermined size, and selecting the smaller one as the middle resolution size.

In step S102, the boundary calculation processing unit 121 reads the data of the processing target image from the cut-out designation processing result file and resizes the data of the processing target image from the original size to the middle resolution size.

In general, since the original size is greater than the middle resolution size, the process of step S102 is a so-called size-reduction process.

In step S103, the boundary calculation processing unit 121 reads the binary label image data from the cut-out designation processing result file, resizes the binary label image from the reduced size to the middle resolution size, and thereby generates a middle resolution binary label image.

In general, since the reduced size is less than the middle resolution size, the process of step S103 is a so-called size-enlargement process.

Since the middle resolution binary label image should be a two-valued label image by definition, As the method of resizing the binary label image, a method such as the nearest neighbor method or a method that re-binarizes the result acquired by means of the bicubic method or the like may be employed.

In step S104, the boundary calculation processing unit 121 generates a trimap of the middle resolution size from the middle resolution binary label image.

The trimap has a three-valued label of foreground, background, and intermediate for each pixel location (x,y).

Here, the intermediate label area of the trimap is a union area of a first area and a second area described as follows.

On the one hand, the foreground label area from the middle resolution binary label image is expanded by a predetermined width (dilation in the morphology processing), and the resultant expansion area (not including the original binary foreground label area) is employed as the first area.

On the other hand, the background label area from the middle resolution binary label image is expanded by a predetermined width (dilation in the morphology processing), and the resultant expansion area (not including the original binary background label area) is employed as the second area.

The intermediate label area is acquired as the union of the first and second areas. Such an intermediate label area is an area that is acquired by slightly widening the boundary area specified by the user with the boundary pen 253. This means that, at this stage, the user has specified not only the boundary area but also a reference area for the intermediate label area in the matte processing, using the boundary pen 253.

In the area excluding the intermediate label area thus acquired, the binary foreground label area becomes the foreground label area of the trimap, and the binary background label area becomes the background label area of the trimap.

In step S105, the boundary calculation processing unit 121 specifies a set of blocks which covers the trimap of the middle resolution size. This means that the boundary calculation processing unit 121 specifies, as the set of blocks, a predetermined number and a predetermined shape of blocks sufficient to cover the trimap of the middle resolution size.

Each block is set so as to have an overlap area having a predetermined width at the boundary with adjacent blocks.

In step S106, the boundary calculation processing unit 121 sets a processing target block from among the set of blocks specified in the process of step S105.

In step S107, the boundary calculation processing unit 121 inputs, as the processing target block, a block of the trimap and a corresponding block of the processing target image of the middle resolution size, and executes the matte processing based on the input.

As a result of the matte processing of step S107, the mix ratio α (alpha value) and the foreground pixel value F are acquired for each constituent pixel of the processing target block.

In step S108, the boundary calculation processing unit 121 determines whether or not each block has been set as the processing target.

If there remains a block that has not been set as the processing target, a determination of NO is made in step S108, control goes back to step S106, and the processes thereafter are repeated. This means that the loop processing from steps S106 to S108 is repeated, and thereby each of the blocks specified in the process of step S105 is sequentially set as the processing target, and the matte processing is executed each time the loop processing is repeated.

When the matte processing on the final block is executed, a determination of YES is made in step S108, and control proceeds to step S109.

In step S109, the boundary calculation processing unit 121 creates a set of mix ratios α of the middle resolution size (hereinafter, referred to as a "middle resolution α image") and a set of foreground pixel values F of the middle resolution size (hereinafter, referred to as a "middle resolution foreground F image"), respectively, as mosaics of blocks of the mix ratios α (alpha value) and the foreground pixel values F, based on the mix ratios α (alpha value) and the foreground pixel values F of each block.

With regard to the overlap areas between adjacent blocks, it is assumed that the boundary calculation processing unit 121 blends both blocks at a smoothly changing blend rate to alleviate mismatches formed at block boundaries.

In this manner, the boundary calculation processing ends. Then, as shown in FIG. 10, the finish adjustment unit 112 (FIG. 4) determines that the state transition condition C44 is satisfied, and causes the state of the client apparatus 11 to transition to the finish check screen operation processing state S44.

Figure 12:
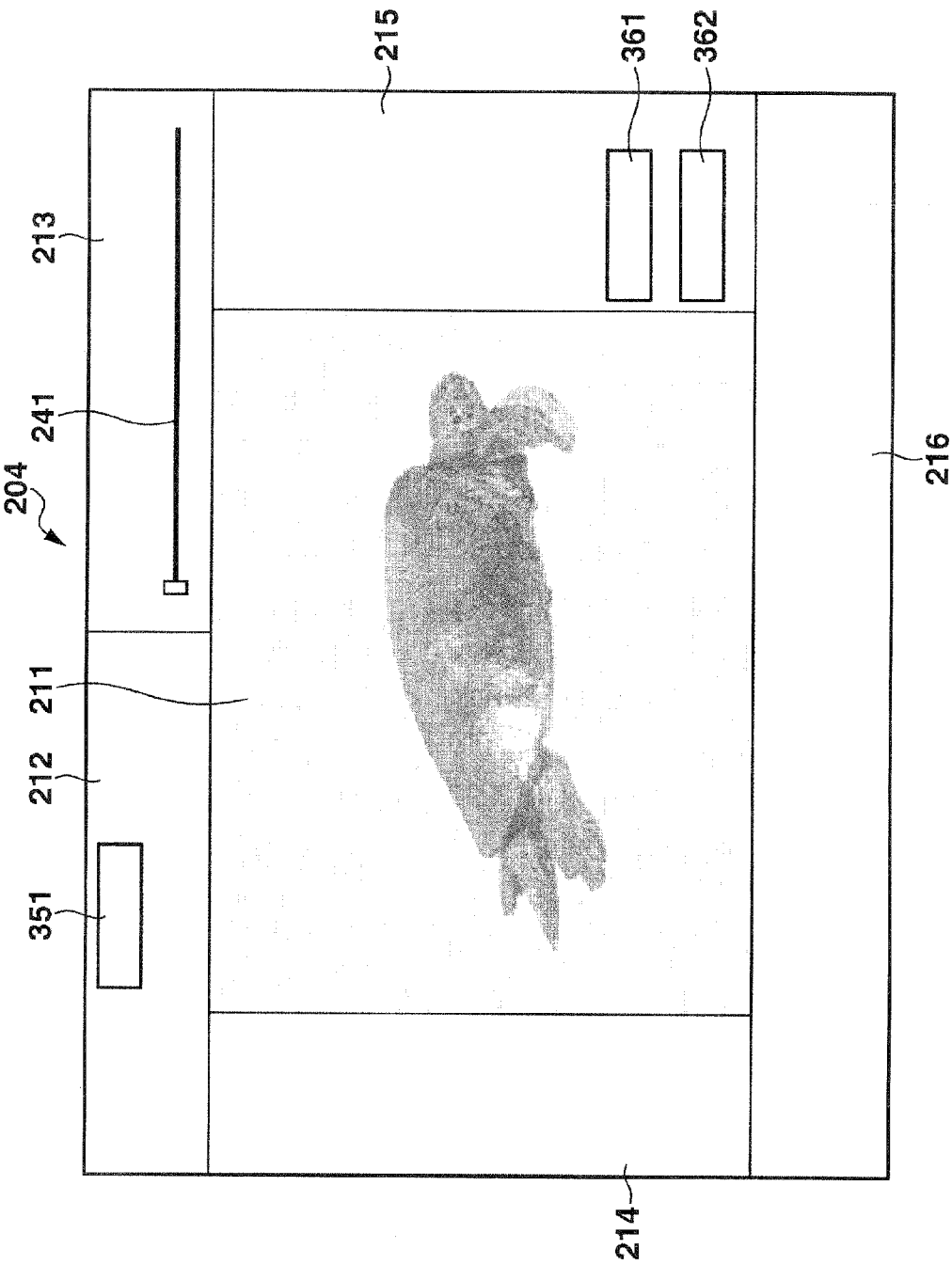
FIG. 12 is a diagram showing one example of a finish check screen for use in the finish adjustment processing shown in FIG. 10.

Upon transition to the finish check screen operation processing state S44, the finish adjustment unit 112 displays a finish check screen shown in FIG. 12 on the display unit 38.

FIG. 12 shows one example of a finish check screen. The finish check screen 204 is a screen to check the image finished at the boundary area by the matte processing. The finish check screen 204 is divided into 6 display areas 211 to 216, similarly to the base screen 201 (FIG. 6).

In the display area 211, the result of the boundary calculation processing is displayed.

This means that the data of the processing target image of the middle resolution size and data (resized to the middle resolution as needed) of a new background image provided in advance are combined in accordance with the above-described equation (2), and the resultant composite image P' is displayed in the display area 211.

In this case, each constituent pixel value of data of the new background image is substituted into equation (2) as the background pixel value B'[x,y,c], each pixel value of the middle resolution α image is substituted into equation (2) as the mix ratio α[x,y], and each pixel value of the middle resolution foreground F image acquired by the matte processing is substituted into equation (2) as the foreground pixel value F[x,y,c].

As the new background image at the initial state, a gray (single color) image is displayed in the display area 211.

A change background button 351 is displayed in the display area 212.

Therefore, by pressing down the change background button 351, the user can change the background image displayed in the display area 211 to a desired image from among a plurality of new background images.

There is no limitation to the new background image, and, in addition to the default images set in advance, any image can be set as a new background in accordance with a user's preference. However, it is assumed that the setting of the new background image is made on another screen, which is not illustrated.

Thus, the user can instantaneously switch a background image to a new background image of a wide variety simply by pressing down, i.e., by clicking the change background button 351 using a mouse or the like of the operation unit 37. Accordingly, the result of the matte processing can be easily recognized as a concrete image of a composite image.

The display image 213 contains a scaling slider 241.

Accordingly, the user can enlarge the size of a part of interest in the composite image P' acquired as a result of the matte processing by operating the scaling slider 241. After that, the user can also reduce the size of the enlarged composite image P' within a range down to normal scale by operating the scaling slider 241.

The display area 215 contains a software button 361 (hereinafter, referred to as a "finish adjustment button 361") that reads "finish adjustment" and a software button 362 (hereinafter, referred to as a "save button 362") that reads "save".

When the user checks the composite image P' displayed in the display area 211 and further desires to partially modify the finished part of the boundary area, the user can instruct that finish adjustment processing be started by pressing down the finish adjustment button 361.

When the finish adjustment button 361 is pressed down, as shown in FIG. 10, the finish adjustment unit 112 (FIG. 4) determines that the state transition condition C45 is satisfied and causes the state of the client apparatus 11 to transition to the finish adjustment screen operation processing state S45.

Figure 13:
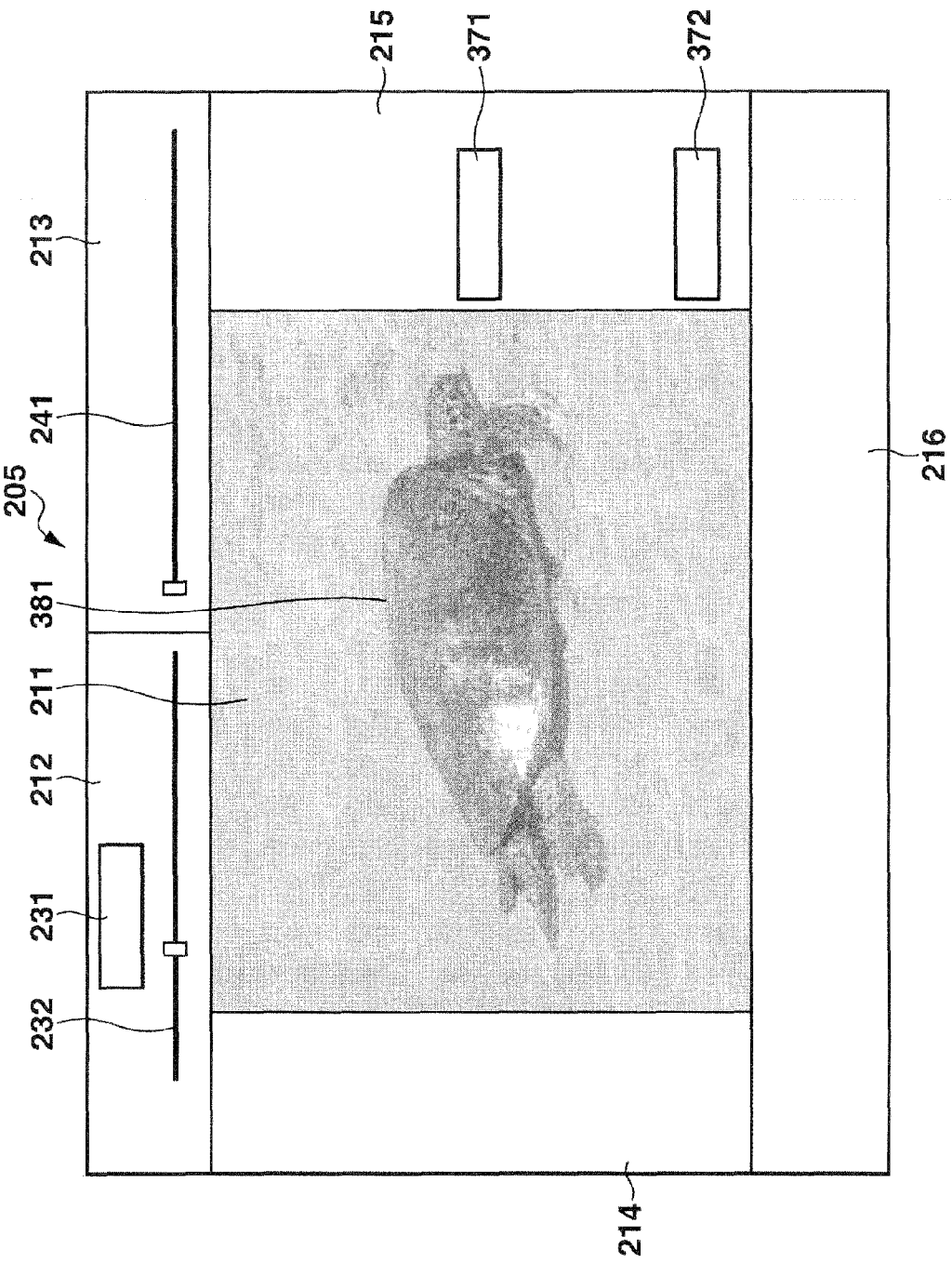
FIG. 13 is a diagram showing one example of a finish adjustment screen for use in the finish adjustment processing shown in FIG. 10.

Upon transition to the finish adjustment screen operation processing state S45, the finish adjustment unit 112 displays a finish adjustment screen shown in FIG. 13 on the display unit 38.

FIG. 13 shows one example of a finish adjustment screen.

The finish adjustment screen 205 is a screen to partially finish the processing target image whose boundary area has been finished by the matte processing. For example, the finish adjustment screen 205 is used to modify the smoothness of a part of the boundary so that a detailed part such as a hair is neatly expressed. The finish adjustment screen 205 is divided into 6 display areas 211 to 216, similarly to the base screen 201 (FIG. 6).

The display area 211 displays the select area as foreground, the non-select area as background, and the boundary area (the area 381 in the example of FIG. 12) as boundary therebetween, distinctly from one another, from the processing target image whose boundary area has been finished.

This means that the display area 211 displays a composite image in which the trimap (of the middle resolution size) is superimposed on the processing target image (of the middle resolution size).

In this case, transparency is set in the upper layer of the trimap. In the foreground label area of the trimap, the transparency rate is fixed to 100%, and the processing target image (the sea turtle in the example of FIG. 13) is displayed always as it is. On the other hand, in the background label area of the trimap, which is displayed in the background color (single color), the user can view and recognize the background element of the processing target image more clearly as the transparency thereof becomes higher. Similarly, in the intermediate label area of the trimap, which is displayed in the boundary color (single color), the user can view and recognize the boundary element of the processing target image more clearly, as the transparency thereof becomes higher.

For this purpose, similar to the cut-out modification screen 203 of FIG. 8, the display area 212 contains a change color button 231 and a change transparency slider 232, and the display area 213 contains a scaling slider 241

However, since the change color button 231, the change transparency slider 232, and the scaling slider 241 have been already described as respective elements of the cut-out modification screen 203 of FIG. 8, a description thereof is omitted here.

The display area 215 contains a software button 371 (hereinafter, referred to as an "undo button 371") that reads "undo" and a software button 372 (hereinafter, referred to as a "check screen button 372") that reads "check screen". In cases such as when the content of the previous operation has been mistakenly done, the user can undo the previous operation by pressing down the undo button 371.

A description of the check screen button 372 will be given later.

In the state in which the finish adjustment screen 205 of FIG. 13 is displayed on the display unit 38, the user can instruct that the finishing area designation screen display, by clicking on the part to be modified from the image displayed in the display area 211 using the mouse of the operation unit 37.

When an instruction is given to display the finishing area designation screen by such a click operation, as shown in FIG. 10, the finish adjustment unit 112 (FIG. 4) determines that the state transition condition C46 is satisfied and causes the state of the client apparatus 11 to transition to the finishing area designation screen operation processing state S46.

Upon transition to the finishing area designation screen operation processing state S46, the finish adjustment unit 112 causes the display unit 38 to display the finishing area designation screen of the same configuration as the base screen 201 shown in FIG. 6.

The display area 211 of the finishing area designation screen displays a partial image of a predetermined size, centered on the clicked part of the finish adjustment screen 205 of FIG. 13 as described above. The constitution of the finishing area designation screen is the same as that of the base screen 201 of FIG. 6; therefore, the description thereof is omitted.

More specifically, the finish adjustment unit 112 delimits an area including the vicinity of the part clicked in the finish adjustment screen 205 of FIG. 13, as a block. It is not necessary that this block coincides in size, location, or shape with the block specified in the process of step S105 of FIG. 11.

The finish adjustment unit 112 causes the original image (processing target image) and the trimap in the block to be displayed transparently in the display area 211, as the partial image.

The user can modify the select area or the like within the partial image using the mouse or the like of the operation unit 37.

For this purpose, the display area 212 contains a change color button 231, a change transparency slider 232, and the display area 213 contains a scaling slider 241, similar to the cut-out modification screen 203 of FIG. 8.

Since the change color button 231, the change transparency slider 232, and the scaling slider 241 have been already described as respective elements of the cut-out modification screen 203 of FIG. 8, a description thereof is omitted here.

Within the partial area displayed in the display area 211, the user can modify the non-select area as background using the background pen 252. Also, the user can modify the boundary area using the boundary pen 253, and the select area as foreground area using the eraser 254. With such modification operations, the user can modify the trimap in the form of the partial image displayed in the display area 211.

Although the user can change (reposition) the displayed part thereof (part to be worked) using the reposition icon 251, if necessary, the change (reposition) of the displayed part may be made prohibited. Furthermore, in order to change the draw size of the background pen 252, the boundary pen 253, or the eraser 254, the user may set the pen size options box 255.

The display area 215 of the finishing area designation screen contains a software button 261 (hereinafter, referred to as an "undo button 261") that reads "undo", a software button 262 (hereinafter, referred to as a "boundary calculation button 262") that reads "boundary calculation", a software button 263 (hereinafter, referred to as a "finish adjustment button 263") that reads "finish adjustment", and a software button 264 (hereinafter, referred to as a "check screen button 264") that reads "check screen". The constitution of the finishing area designation screen is the same as that of the base screen 201 of FIG. 6; therefore, a detailed description thereof is omitted.

In cases such as when the content of the previous operation has been mistakenly done, the user can undo the previous operation by pressing down the undo button 261.

After the select area or the like has been modified, i.e., the trimap has been modified as a result of the operations, the user can instruct that recalculation of the boundary calculation (partial matte processing) be started by pressing down the boundary calculation button 262

When the boundary calculation button 262 of the finishing area designation screen is pressed down, as shown in FIG. 10, the finish adjustment unit 112 (FIG. 4) determines that the state transition condition C47 is satisfied, and causes the state of the client apparatus 11 to transition to the partial boundary calculation processing state S47. The constitution of the finishing area designation screen is the same as that of the base screen 201 of FIG. 6, therefore, a description thereof is omitted.

Upon transition to the partial boundary calculation processing state S47, the boundary calculation processing unit 121 of the finish adjustment unit 112 executes partial matte processing on the select area that has been modified by the user.

In the present embodiment, the partial matte processing is not the processing which has been described with reference to the flowchart of FIG. 11, but is carried out as follows.

The boundary calculation processing unit 121 of the finish adjustment unit 112 executes the matte processing on the block displayed in the display area 211 of the finishing area designation screen, using the already modified trimap. The constitution of the finishing area designation screen is the same as that of the base screen 201 of FIG. 6; therefore, a description thereof is omitted.

The boundary calculation processing unit 121 creates a set of the mix ratios $\alpha$ (alpha value) and a set of the foreground pixel values F acquired as a result of the matte processing, as mosaics of blocks, and fits them into respective entire images.

This means that the boundary calculation processing unit 121 smoothly blends the mix ratios α (alpha value) and the foreground pixel values F in the vicinity of the boundary of blocks of a predetermined width and overwrites the mix ratios α (alpha value) and the foreground pixel values F inside the boundary.

When the middle resolution α image and the middle resolution foreground F image are thus constructed, as shown in FIG. 10, the finish adjustment unit 112 (FIG. 4) determines that the state transition condition C48 is satisfied, and causes the state of the client apparatus 11 to transition to the finish adjustment screen operation processing state S45 again.

Upon transition to the finish adjustment screen operation processing state S45 again, the finish adjustment screen 205 (FIG. 13) is displayed again on the display unit 38. In this case, the display area 211 of the finish adjustment screen 205 displays the result of the partial matte processing.

On the other hand, if the finish adjustment button 263 of the finishing area designation screen is pressed down, as shown in FIG. 10, it is determined that the state transition condition C49 is satisfied, and the state of the client apparatus 11 transitions to the finish adjustment screen operation processing state S45 again. The constitution of the finishing area designation screen is the same as that of the base screen 201 of FIG. 6; therefore, a description thereof is omitted.

In this case also, the finish adjustment screen 205 (FIG. 13) is displayed again on the display unit 38, and the image displayed in the display area 211 of the finish adjustment screen 205 remains the same as before.

Viewing the display area 211 of the finish adjustment screen 205 (FIG. 13), if the user desires to perform further modification, the user may again click on a part to be modified using the mouse of the operation unit 37.

In this case, as shown in FIG. 10, it is determined that the state transition condition C46 is satisfied, the state of the client apparatus 11 transitions into the finishing area designation screen operation processing state S46 again, and the finishing area designation screen is displayed again. The constitution of the finishing area designation screen is the same as that of the base screen 201 of FIG. 6; therefore, a description thereof is omitted.

After the above-described operation is repeated, and the finishing area designation screen is again modified, i.e., the trimap is again modified, the user may press down the boundary calculation button 262. Then, as shown in FIG. 10, it is determined that the state transition condition C47 is satisfied, and the state of the client apparatus 11 transitions to the partial boundary calculation processing state S47 again.

Upon transition to the partial boundary calculation processing state S47 again, the partial matte processing is executed again on the select area that has been modified again by the user. This means that the middle resolution α image and the middle resolution foreground F image are reconstructed. With this, it is determined that the state transition condition C48 is satisfied again, and the state of the client apparatus 11 transitions to the finish adjustment screen operation processing state S45 again.

Upon transition to the finish adjustment screen operation processing state S45 again, the finish adjustment screen 205 (FIG. 13) is displayed again on the display unit 38. In this case, the display area 211 of the finish adjustment screen 205 displays the reprocessing result of the partial matte processing.

By repeating such a series of operations, the user can modify the select area or the like as many times as the user likes until a desired result is acquired.

After repeating such modification operations, when the user determines that a desired result is acquired, the user may instruct that the finish check screen be displayed by pressing down the check screen button 372 in a state in which the finish adjustment screen 205 (FIG. 13) is displayed on the display unit 38.

When the check screen button 372 is thus pressed down, as shown in FIG. 10, it is determined that the state transition condition C50 is satisfied, and the state of the client apparatus 11 transitions into the finish check screen operation processing state S44 again. Then, the finish check screen 204 (FIG. 12) is displayed on the display unit 38 again.

Similarly, when the check screen button 264 of the finishing area designation screen is pressed down, as shown in FIG. 10, it is determined that the state transition condition C51 is satisfied, the state of the client apparatus 11 transitions into the finish check screen operation processing state S44 again, and the finish check screen 204 (FIG. 12) is displayed on the display unit 38 again. The constitution of the finishing area designation screen is the same as that of the base screen 201 of FIG. 6; therefore, a description thereof is omitted.

If a desired modification result is acquired, the user may press down the save button 362 of the finish check screen 204 (FIG. 12) in order to save the result of the finish adjustment processing.

Then, as shown in FIG. 10, it is determined that the state transition condition C52 is satisfied, and the state of the client apparatus 11 transitions into the result storing processing state S48.

Upon transition to the result storing processing state S48, if the output size is equal to the middle resolution size, the finish adjustment unit 112 generates a file including at least the data of the middle resolution α image and the data of the middle resolution foreground F image, and stores the file in the image storing unit 132 of the storing unit 39.

Hereinafter, such a file is referred to as a "finish adjustment result file".

In general, however, since the output size is greater than the middle resolution size, the finish adjustment unit 112 executes the following series of processes, thereby generates the finish adjustment result file, and stores the file in the image storing unit 132 of the storing unit 39.

The finish adjustment unit 112 resizes the data of a middle resolution α image and data of the middle resolution foreground F image into the output size. Hereinafter, the image of the output size thus resized from the middle resolution α image is referred to as an "output size a image". Also, the image of the output size thus resized from the middle resolution foreground F image is referred to as an "output size foreground F image".

The finish adjustment unit 112 resizes the data of the processing target image P (input image P) into the output size.

The finish adjustment unit 112 updates, for each pixel of the output size, the foreground pixel value F[x,y,c] at a pixel location (x,y) where the mix ratio α[x,y]>t (t is a predetermined threshold value, which is near but not exceeding 1) to the pixel value P[x,y,c] of the processing target image P at a corresponding pixel location (x,y).

The finish adjustment unit 112 generates a finish adjustment result file including at least data of the output size a image and data of the output size foreground F image that has been updated, and stores it in the image storing unit 132 of the storing unit 39.

When the finish adjustment result file is thus stored in the storing unit 39, it is determined that the state transition condition C53 is satisfied, and the finish adjustment processing of FIG. 10 ends.

After that, in the present embodiment, the client apparatus 11 or the server 12 (hereinafter, for ease of description, represented by the server 12) can run a program (not shown) to execute the following processing. The server 12 accepts a user's selection of a new background to be printed out and a special effect filter to be applied to the new background or foreground, and presents a preview image of the final printout to the user for a user's confirmation. Upon the user's consent, the server 12 settles the payment and prints out a composite image of the cut-out foreground and the new background on a medium such as paper.

More specifically, each constituent pixel value of a new background is substituted into the above-described equation (2) as the background pixel value B'[x,y,c], each pixel value of the output size α image is substituted into equation (2) as the mix ratio α[x,y], and each pixel value of the output size foreground F image is substituted into equation (2) as the foreground pixel value F[x,y,c]. Then, the equation (2) is calculated, and the resultant composite image P' is printed out on a paper medium.

As described above, in essence, the matte processing is carried out to solve the above-described equation (1). However, the speed of solving an equation is determined by the number of unknowns.

In the present embodiment, since processing in the middle resolution size (hereinafter, referred to as "middle resolution processing") is employed, it is possible to greatly reduce the number of unknowns, which are mix ratios α and the foreground pixel values F in the intermediate label area. As a result of this, processing speed is greatly improved.

It is to be noted that the resolution of the foreground pixel value F is lower than the resolution of the processing target image (original image such as a captured image, i.e., input image). Accordingly, if the middle resolution processing is simply applied, the quality of outputs such as a print is degraded.

Therefore, in the cut-out processing of the present embodiment, by judging the alpha values, the pixel values of the middle resolution foreground F image having no mixed color are employed in the boundary area, and the pixel values of the high resolution processing target image (original image such as a captured image, i.e., input image) are employed in the inner area (to be used as foreground). In this way, it is possible to realize a high processing speed while preventing output quality from degrading as much as possible.

Furthermore, when the processing target image (original image such as a captured image, i.e., input image) is captured, the edge part of the principal subject tends to be defocused since the main part thereof is focused in general. In such a case, the result of the cut-out processing of the present embodiment shows substantially no difference from that of high resolution processing.

Furthermore, even if the matte processing is carried out in a high resolution, there can be a case in which the result of the processing in the boundary area may fail to realize precision corresponding to the high resolution due to noise in the processing target image (original image such as a captured image, i.e., input image) or a fundamental similarity between the foreground and the background. In such a case, the result of the cut-out processing of the present embodiment shows substantially no difference from that of high resolution processing.

In the above, a detailed description has been given of the cut-out processing carried out by the image processing system having the functional configuration of FIG. 4 with reference to FIGS. 5 to 13.

In the following, a description will be given of the relationship between the processes on the side of the client apparatus 11 and on the side of the server 12 in a case in which the cut-out processing is carried out by the image processing system having the functional configuration of FIG. 4 with reference to FIG. 14.

Figure 14:
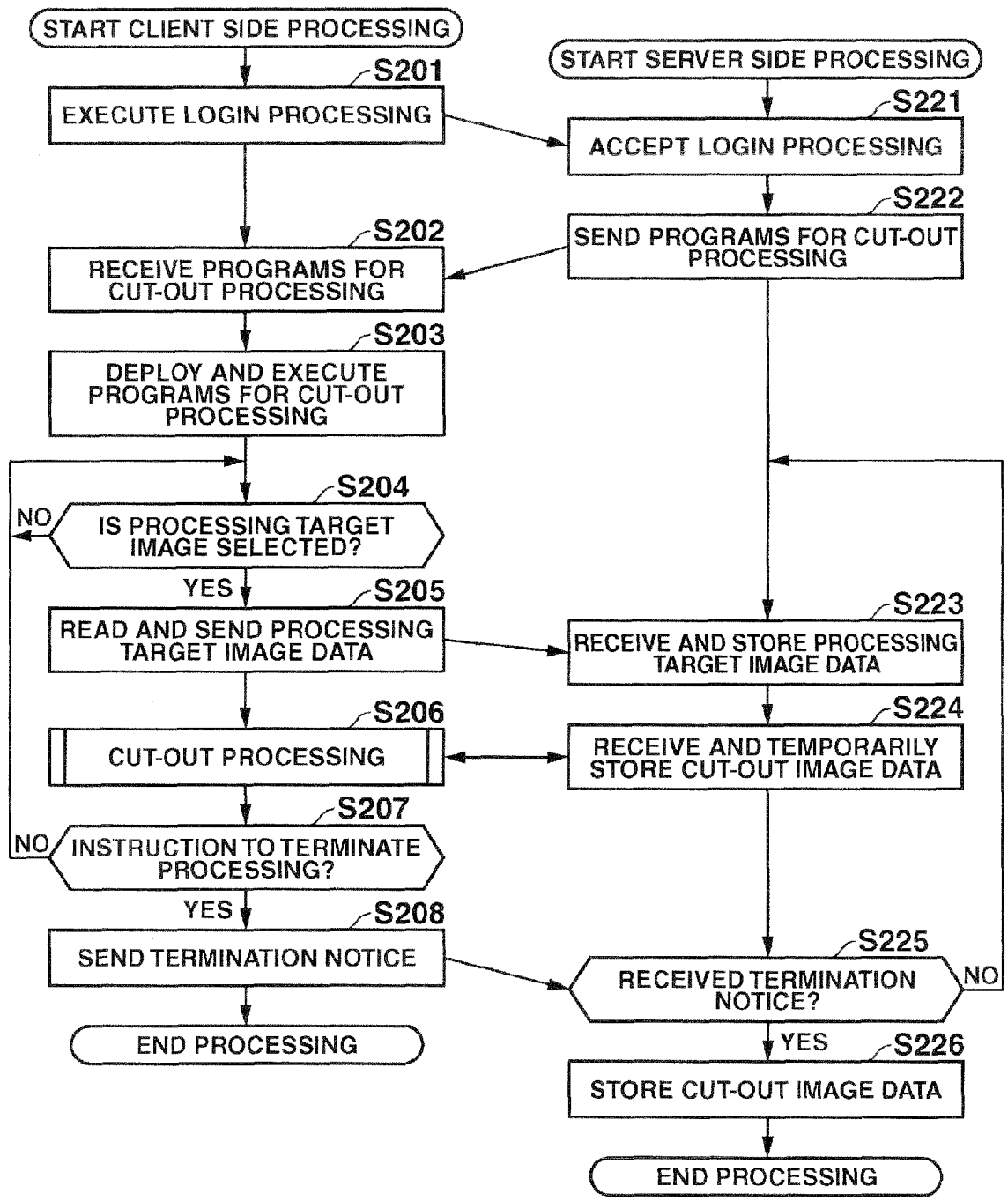
FIG. 14 is a flowchart showing relationships between the processes of the client apparatus and the server shown in FIG. 1 in a case in which the cut-out processing is carried out by collaboration thereof.

FIG. 14 is a flowchart showing, in a case in which the client apparatus 11 and the server 12 collaborate to carry out the cut-out processing, relationship between each other's processes.

The left side of FIG. 14 shows a flowchart showing flow of the processing on the side of the client apparatus 11, and the right side thereof shows a flowchart showing flow of the processing on the side of the server 12. The arrows drawn from one of the client apparatus 11 side and the server 12 side to the other is intended to mean that information is transmitted in the direction of the arrow.

In step S201, the communication control unit 101 of the client apparatus 11 of FIG. 4 executes login processing on the server 12 based on a user operation of the operation unit 37.

In step S221, the communication control unit 151 of the server 12 accepts the login processing initiated by the client apparatus 11.

In step S222, the communication control unit 151 of the server 12 reads the programs for cut-out processing from the program storing unit 161 and causes the communication unit 59 to send them to the client apparatus 11.

In step S202, the communication control unit 101 of the client apparatus 11 causes the communication unit 40 to receive the programs for cut-out processing sent from the server 12 via the network 21.

In step S203, the communication control unit 101 of the client apparatus 11 causes the program storing unit 131 to temporarily store the programs for cut-out processing, and then deploys them in the RAM 33 (FIG. 2) or the like to execute them. In this way, the CPU 31 of the client apparatus 11 becomes able to implement a function as the cut-out processing unit 102.

In step S204, the cut-out processing unit 102 of the client apparatus 11 determines whether or not the processing target image is selected.

The user can select any desired image such as a captured image as the processing target image by operating the operation unit 37.

If no user selection operation has been performed, a determination of NO is made in step S204, and control goes back to step S204 again. This means that the determination process of step S204 is repeated until a user selection operation is performed, and the processing on the side of the client apparatus 11 enters into a waiting state.

After that, when a user selection operation is performed, a determination of YES is made in step S204, and control proceeds to step S205.

In step S205, the communication control unit 101 of the client apparatus 11 reads the processing target image data from the image storing unit 132 and causes the communication unit 40 to send it to the server 12.

In step S223, the communication control unit 151 of the server 12 causes the communication unit 59 to receive the processing target image data sent from the client apparatus 11 via the network 21, and stores it in the image storing unit 162.

On the other hand, in step S206, the cut-out processing unit 102 of the client apparatus 11 executes the above-described cut-out processing on the data of the processing target image.

Figure 15:
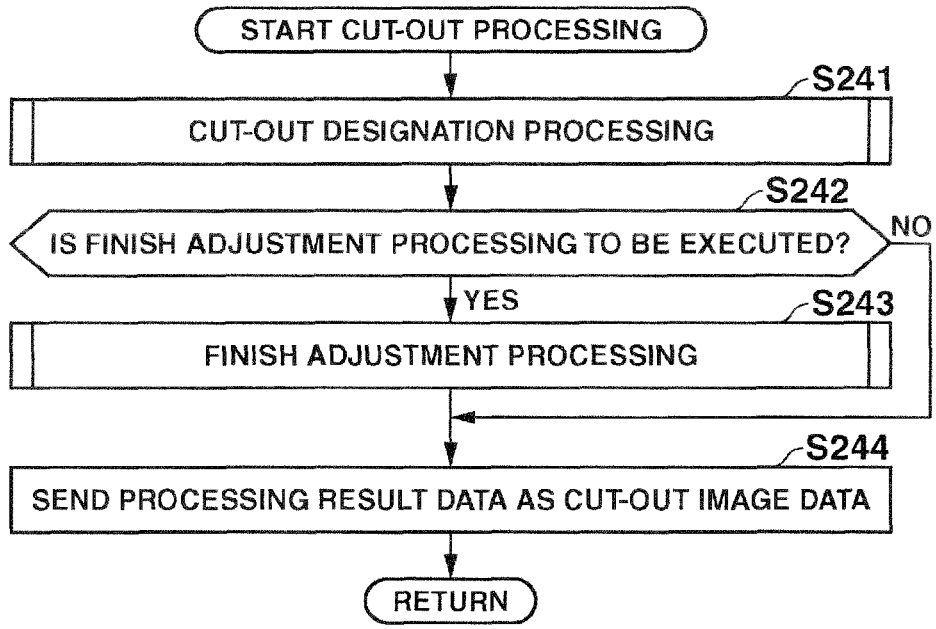
FIG. 15 is a flowchart showing a flow of the cut-out processing from the client side processing shown in FIG. 14.

FIG. 15 is a flowchart showing flow of the cut-out processing of step S206 from the client side processing.

In step S241, the cut-out designation unit 111 of the cut-out processing unit 102 executes the cut-out designation processing. A detailed description of the cut-out designation processing has been already given with reference to FIGS. 5 to 9 and is therefore omitted here.

In step S242, the cut-out processing unit 102 determines whether or not the finish adjustment processing is to be executed.

As described above, since it is possible to cut out the foreground from the processing target image using the result of the cut-out designation processing alone, the finish adjustment processing is not indispensable but freely selectable by the user.

When the user operates the operation unit 37 to instruct that the finish adjustment processing be executed, a determination of YES is made in step S242, and control proceeds to step S243. In step S243, the finish adjustment unit 112 of the cut-out processing unit 102 executes the finish adjustment processing. A detailed description of the finish adjustment processing has already given with reference to FIGS. 10 to 13 and is therefore omitted here.

When the finish adjustment processing ends, control proceeds to step S244, which will be described later.

On the other hand, if the user operates the operation unit 37 to instruct that the finish adjustment processing not be executed, a determination of NO is made in step S242, and control proceeds to step S244 without the finish adjustment processing of step S243 being executed.

In step S244, the communication control unit 101 of the client apparatus 11 causes the communication unit 40 to send the data of the processing result as the cut-out image data to the server 12.

For example, in a case in which the finish adjustment processing has not been executed (in which NO has been determined in the process of step S242), the cut-out designation processing result file described above is sent to the server 12 as the cut-out image data.

On the other hand, in a case in which the finish adjustment processing has been executed (in which YES has been determined in the process of step S242, and the process of step S243 has been executed), the finish adjustment result file is sent to the server 12 as the cut-out image data.

In the cut-out designation processing or the finish adjustment processing, as described above, it is possible to save data when the processing is still in a state of being in progress, and, when the data saved when the processing is still in a state of being in progress is restored, the processing can be resumed from the state at the time of being saved. Accordingly, if necessary, such data saved when the processing is still in a state of being in progress can also be sent to the server 12 as the cut-out image data.

Back to FIG. 14, in step S224, the communication control unit 151 of the server 12 causes the communication unit 59 to receive the cut-out image data sent from the client apparatus 11 via the network 21, and temporarily stores it in the image storing unit 162.

Meanwhile, in step S207, the cut-out processing unit 102 of the client apparatus 11 determines whether or not an instruction has been given to terminate the processing.

Although the method of instruction to terminate the processing is not limited, in the present embodiment, it is assumed that a method is employed such that the user operates the operation unit 37 to instruct termination of the processing.

If there has been no such operation of instructing that the processing be terminated, a determination of NO is made in step S207, control goes back to step S204, and the processes thereafter are executed. This means that, until it is instructed that the processing be terminated, the loop processing from steps S204 to S207 is repeated, and the cut-out processing is executed, and the cut-out image data is sent to the server 12 each time the loop processing is repeated.

After that, when an operation is performed to instruct that the processing be terminated, a determination of YES is made in step S207, and control proceeds to step S208.

In step S208, the communication control unit 101 of the client apparatus 11 causes the communication unit 40 to send a notice of termination (hereinafter, referred to as a "termination notice") to the server 12.

In this manner, the processing on the side of the client apparatus 11 is terminated.

Meanwhile, in step S225, the communication control unit 151 of the server 12 determines whether or not a termination notice has been received.

If no termination notice has been received, a determination of NO is made in step S225, control goes back to step S223, and the processes thereafter are repeated. This means that, since no termination notice is sent while the loop processing from steps S204 to S207 is repeatedly executed on the side of the client apparatus 11 as described above, the loop processing from steps S223 to S225 is repeated, and the processing target image data and the cut-out image data are received and stored each time the processing target image data and the cut-out image data are sent from the client apparatus 11.

After that, when the termination notice is received, a determination of YES is made in step S225, and control proceeds to step S226.

In step S226, the main control unit 152 of the server 12 stores data of the cut-out image, which has been temporarily stored.

Thus, the processing on the side of the server 12 is terminated.

After that, though not illustrated, the server 12 accepts a user's selection of a new background to be printed out and a special effect filter to be applied to the new background or foreground, and presents the preview image of the final printout to the user for user confirmation.

Upon user consent, the server 12 settles the payment and prints out a composite image of the cut-out foreground and the new background on a medium such as paper.

In the above, a description has been given of one embodiment of the image processing system capable of carrying out the cut-out processing.

In the following, a description will be given of features (effects) of the image processing system by virtue of the cut-out processing with reference to the drawings of FIGS. 16 to 29.

The image processing system of the present embodiment, which can carry out the cut-out processing, has a first feature that provides a simple interactive operation to a user, who is unfamiliar with operations.

As described above, the cut-out processing is divided into the cut-out designation processing and the finish adjustment processing. The finish adjustment processing is processing to perform fine finish adjustment and is not indispensable. This means that the result of the cut-out designation processing (the cut-out designation processing result file) alone is sufficient to cut out a foreground from the processing target image and combine with the foreground with the new background.

As described earlier, the user's GUI operations required to execute the cut-out designation processing are rough operations, which are very easy and not laborious even for a user unfamiliar with operations to operate without causing any trouble.

In the following, a description will be given of specific examples of a user's GUI operation in the cut-out designation processing with reference to FIGS. 16 to 18.

Figure 16:
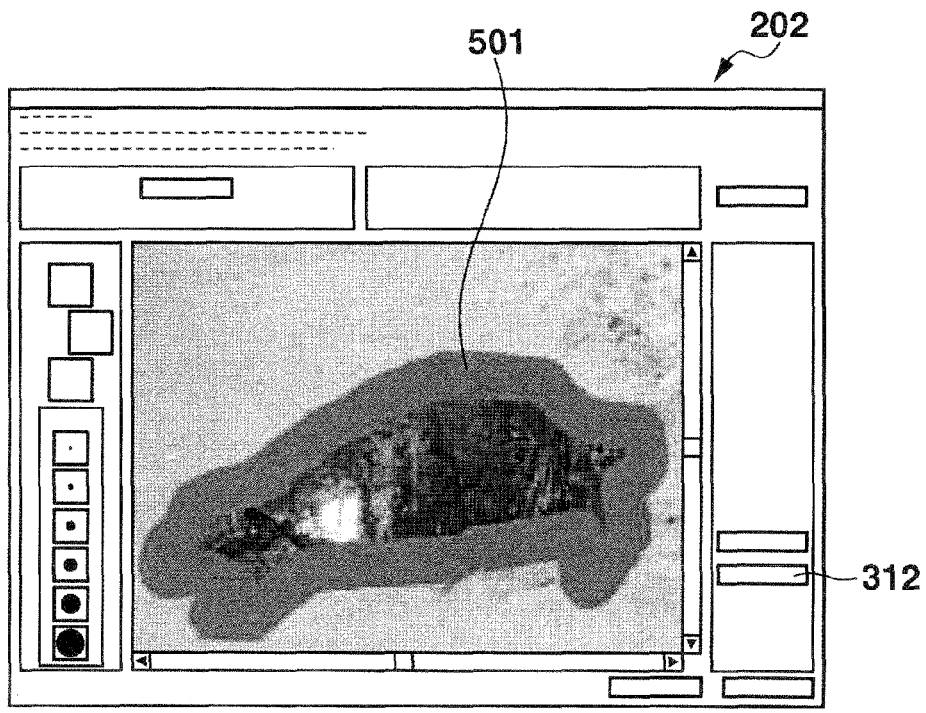
FIG. 16 is a diagram showing one example of a screen displayed when the image processing system shown in FIG. 4 carries out the cut-out processing.

FIG. 16 shows one example of the user's GUI operation on the cut-out area designation screen 202 displayed in the cut-out area designation screen operation processing state S12 (FIG. 5).

As shown in FIG. 16, the user can specify a boundary area 501 between foreground and background from the processing target image displayed in the cut-out area designation screen 202.

Here, the boundary area 501 is not required to be strictly specified with a real boundary line (thin line) between foreground and background, but may be specified roughly with a thick line shown in FIG. 16. This means that the user may specify the boundary area 501 with a line having a thickness, which is flexible to a certain degree, in such a manner that the real boundary line between foreground and background are included.

Also, the user may specify a part for which failure may easily occur, or a part to be finely specified with a special intention, using a thin line.

This means that the user may freely set the pen size options box 255 of FIG. 7 to change the draw size of the boundary pen 253 of FIG. 7, with which the boundary area 501 between foreground and background is specified.

After the boundary area 501 is specified, the user may press down the boundary calculation button 312.

In this manner, the state is transitioned to the boundary calculation processing state S13 (FIG. 5), and the boundary calculation is performed.

Figure 17:
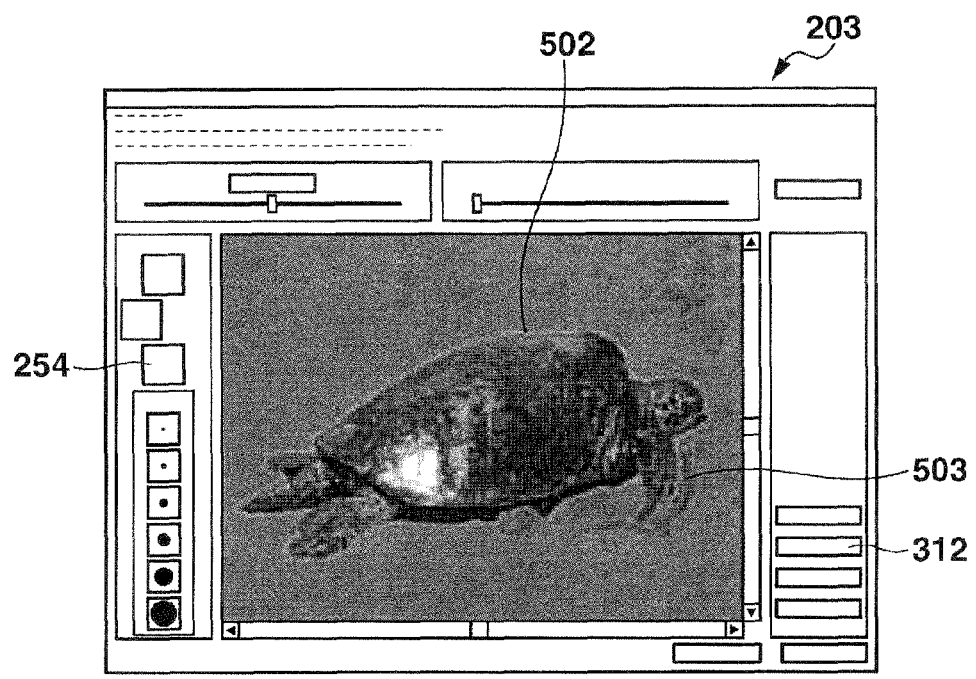
FIG. 17 is a diagram showing one example of a screen displayed when the image processing system shown in FIG. 4 carries out the cut-out processing.

When the boundary calculation is complete, the state is transitioned to the cut-out modification screen operation processing state S14 (FIG. 5), and the cut-out modification screen 203 shown in FIG. 17 is displayed.

FIG. 17 shows one example of the initial state of the cut-out modification screen 203 displayed in the cut-out modification screen operation processing state S14 (FIG. 5).

As shown in FIG. 17, a boundary area 502 is displayed based on the result (binary label image) of the boundary calculation.

However, an area 503 is a part of the sea turtle fin, which should be displayed in the foreground (on the inside of the boundary area 502) but happens to be displayed in the background (on the outside of the boundary area 502). This is caused by the fact that the foreground and background elements in the processing target image are similar in color.

In such a case, the user erases the area 503, which is displayed in the background but should be displayed in the foreground, using the eraser 254, and thereby specifies the area 503 newly as the select area. After that, the user presses down the boundary calculation button 312.

In this manner, the state is transitioned to the boundary calculation processing state S13 (FIG. 5) again, and the boundary calculation is recalculated.

Figure 18:
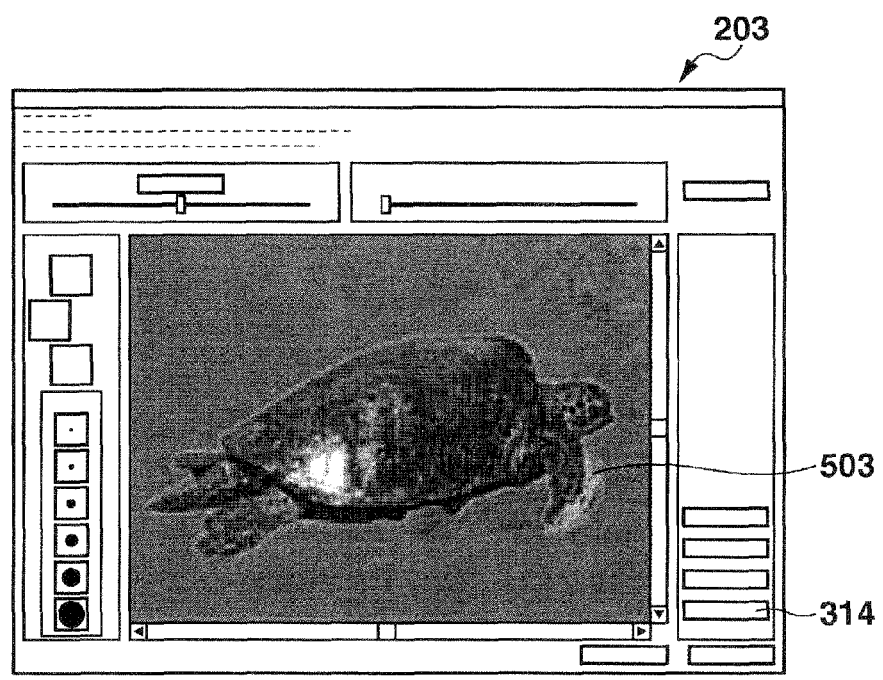
FIG. 18 is a diagram showing one example of a screen displayed when the image processing system shown in FIG. 4 carries out the cut-out processing.

When the recalculation of the boundary calculation is complete, the state is transitioned to the cut-out modification screen operation processing state S14 (FIG. 5) again, and the cut-out modification screen 203 shown in FIG. 18 is displayed.

FIG. 18 shows one example of the result of a GUI operation on the cut-out modification screen 203 displayed in the cut-out modification screen operation processing state S14 (FIG. 5).

As shown in FIG. 18, the boundary area 502 is displayed based on the recalculation result (reconfigured binary label image) of the boundary calculation. It can be noticed that the area 503, which is a part of the sea turtle fin, is now included in an area on the inside of the boundary area 502, i.e., the foreground.

In the state of FIG. 18 it appears that the processing result approximately satisfies the desire of the user. At this time when such a state is acquired, the user presses down the save button 314.

Then, the state is transitioned to the boundary area finish processing state S15 (FIG. 5) and then to the result storing processing state S16 (FIG. 5). As a result, the cut-out designation processing result file indicative of the state of FIG. 18 is stored in the storing unit 39.

After that, it becomes possible for the server 12 (FIG. 1) or the like to cut out, as foreground, at least the image of the sea turtle on the inside of the boundary area 502 by using the cut-out designation processing result file, and to print out a composite image of the foreground and a new background.

Further, the user may cause the client apparatus 11 to carry out the finish adjustment processing so as to make the select area as the user desires.

The image processing system of the present embodiment, which can carry out the cut-out processing, has a second feature that can freely change the display form of segmented areas, in addition to the above-described first feature.

In the cut-out modification screen 203 or the like, while the foreground area is displayed fully transparently, the background area and the boundary area are displayed in semi-transparent colors (with colors of the original image and classification colors being blended) at a transparency ratio arbitrarily variable. The transparency ratio (transparency) can be easily changed by operating the change transparency slider 232.

Figure 19:
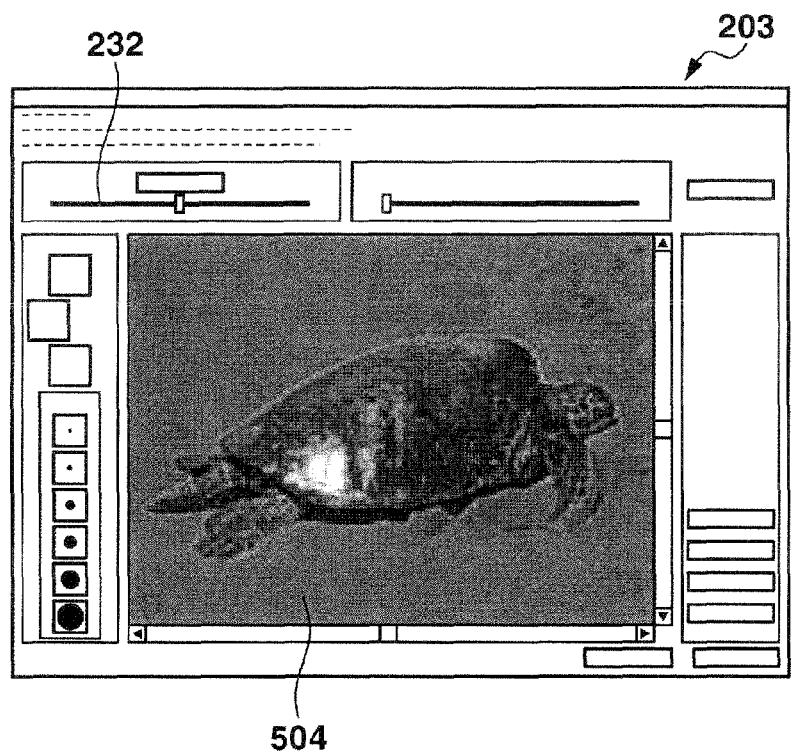
FIG. 19 is a diagram showing one example of a screen displayed when the image processing system shown in FIG. 4 carries out the cut-out processing.
Figure 20:
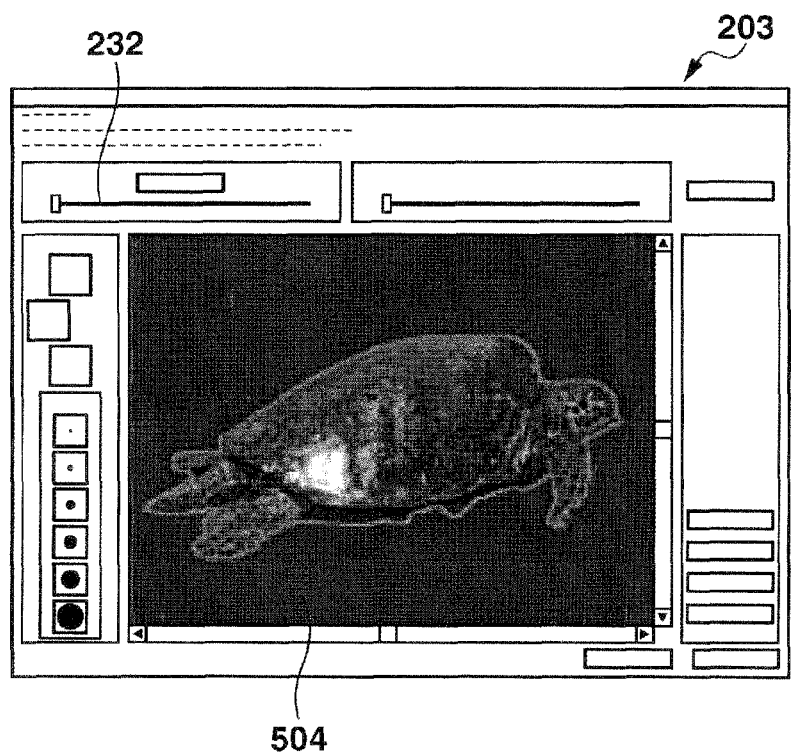
FIG. 20 is a diagram showing one example of a screen displayed when the image processing system shown in FIG. 4 carries out the cut-out processing.
Figure 21:
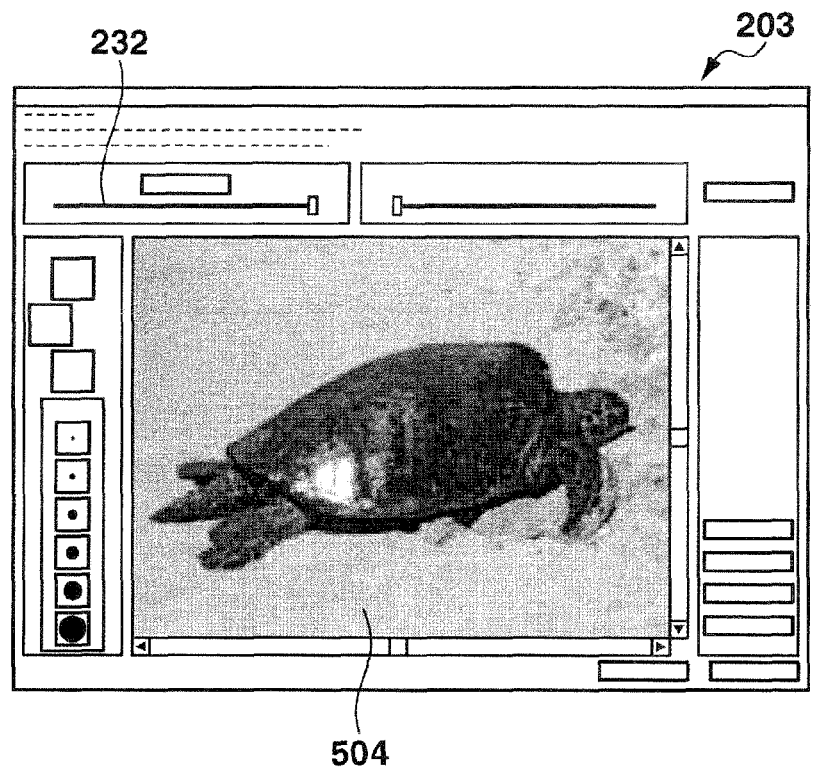
FIG. 21 is a diagram showing one example of a screen displayed when the image processing system shown in FIG. 4 carries out the cut-out processing.

FIGS. 19 to 21 show specific examples of the operation result of the change transparency slider 232.

FIG. 19 shows one example of the initial state of the cut-out modification screen 203 displayed in the cut-out modification screen operation processing state S14 (FIG. 5).

As shown in FIG. 19, based on the result (binary label image) of the boundary calculation, the boundary area, the foreground area of the sea turtle on the inside of the boundary area, and the background area 504 on the outside of the boundary area are displayed.

The background color (for example, blue, though not sufficiently illustrated) of the background area 504 and the boundary color (for example, red, though not sufficiently illustrated) of the boundary area are displayed as being blended with colors of the original image at a mix ratio (a value) corresponding to the handle position of the change transparency slider 232. Here, it is to be noted that the foreground area (sea turtle) is not blended and displayed fully transparently.

In the initial state of FIG. 19, the handle of the change transparency slider 232 is positioned at the center. Therefore, the user can view and recognize the states of the original image (processing target image) and the state (result) of the cut-out foreground simultaneously in a balanced manner.

FIG. 20 shows a state of the cut-out modification screen 203 displayed in the cut-out modification screen operation processing state S14 (FIG. 5) in which the handle of the change transparency slider 232 is dragged to the left end.

The user can freely move the handle of the change transparency slider 232 to a desired position by operating the operation unit 37.

As shown in FIG. 20, when the handle of the change transparency slider 232 is moved to the left end, since the transparency is set to 0%, the background color (for example, blue, though not sufficiently illustrated) is simply displayed in the background area 504, and the boundary color (for example, red, though not sufficiently illustrated) is simply displayed in the boundary area.

This means that, while the original image (the part of the sea turtle) is always displayed fully transparently without being blended with others in the foreground area, the original image (background element) is not displayed and thus completely disappears in the background area 504 and the boundary area. As a result of this, the user can visualize the cut-out state (result) of the foreground of the original image (processing target image) when the background thereof completely disappears. Thus, the state of FIG. 20 is suitable to check the quality of the current condition.

With regard to the background area 504, in place of the image of a single background color, any image (such as a "new background image", which will be described later as a fourth feature) may be employed.

FIG. 21 shows a state of the cut-out modification screen 203 displayed in the cut-out modification screen operation processing state S14 (FIG. 5) in which the handle of the change transparency slider 232 is dragged to the right end.

As shown in FIG. 21, when the handle of the change transparency slider 232 is moved to the right end, the transparency is set to 100%. Accordingly, the background color (for example, blue, though not fully illustrated) completely disappears in the background area 504, and the boundary color (for example, red, though not fully illustrated) completely disappears in the boundary area, and the original image is displayed fully transparently in both areas.

Since the original image (the part of the sea turtle) is always displayed fully transparently without being blended with others in the foreground area, as a result, the entire original image (the entire processing target image) is displayed as it is.

Therefore, the user can easily view and recognize the boundary of the original foreground object (the sea turtle, in the present example) in the original image, without being disturbed by classification colors such as the background color and the boundary color. Thus, the state of FIG. 21 is suitable for a user to determine how to modify the image next.

On account of the second feature, the user can freely move the handle of the change transparency slider 232 to a desired position by operating the operation unit 37. Therefore, the user can confirm the quality of the current condition and determine how to modify the image next at the same time, by simply operating the change transparency slider 232.

Also, with regard to the handle position of the change transparency slider 232, the user can freely select a suitable position depending on the coloration of the original image or the current operation content.

In a case of a semi-transparent display, if the mix ratio (α value) is fixed, it is difficult for an unaccustomed user to determine whether the background color is displayed or the color of the original image itself is displayed, i.e., up to where the background area extends and from where the foreground area begins.

On the other hand, the user of the image processing system of the present embodiment can easily make such a determination by virtue of the second feature. This means that, by moving the handle of the change transparent slider 232, the user can easily determine that an area where the display changes is the boundary area or the background area, while an area where the display does not change is the foreground area. To make such a determination, it is not necessary to move the handle of the change transparent slider 232 up to the right end where the entire original image is displayed. The user can make such a determination by moving the change transparent slider 232 only to a certain extent.

The image processing system of the present embodiment, which can carry out the cut-out processing, has a third feature that can change the classification colors such as the boundary color and the background color with a very small number of times of operations, in addition to the above-described first and second features.

If a classification color such as the boundary color or the background color (blue and red in the above example) resembles the color of the original image, there is a case in which, even if the mix ratio (α value) is changed based on the second feature, the result of the change does not appear sufficiently, and thus the user cannot view and recognize the result.

As an effective countermeasure against such a problem, the classification color may be changed to an appropriate color that is different from that of the original image.

In such a case, a possible method to be taken in general is one in which the user presses down a software button (one example of which is the above-described change color button 231) to which a color change function is assigned, and selects an arbitrary color from a color palette then displayed.

However, such a method requires approximately 5 click operation steps, since the user is required to select the background color and the boundary color respectively, from among a number of colors. In view of this, the image processing system of the present embodiment provides the third feature that allows the color change button 231 to be pressed down at most twice (only with 2 click operation steps) by employing the following method.

Figure 22:
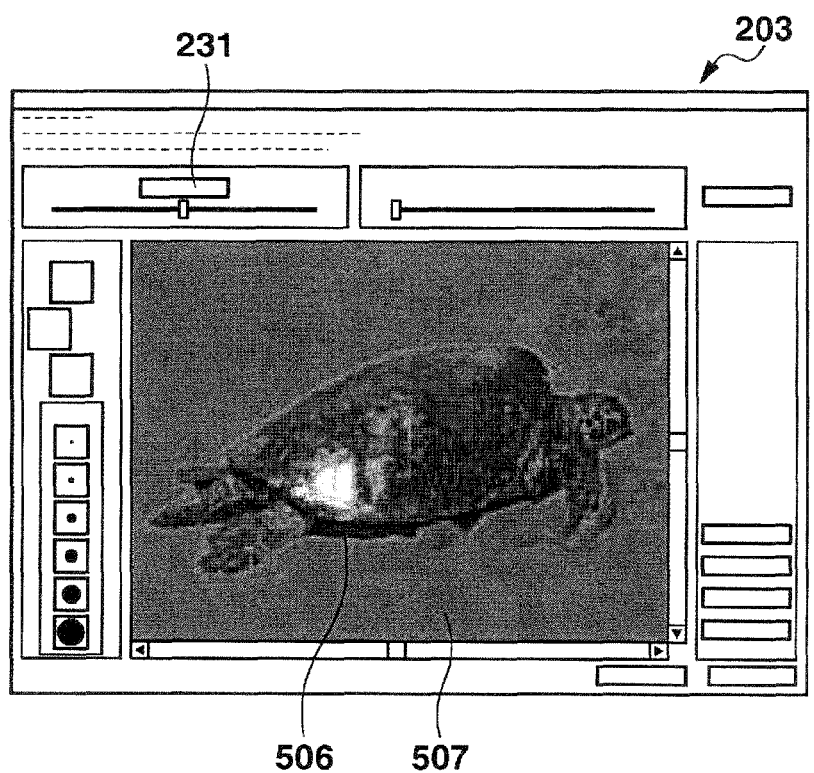
FIG. 22 is a diagram showing one example of a screen displayed when the image processing system shown in FIG. 4 carries out the cut-out processing.

FIG. 22 shows one example of the initial state of the cut-out modification screen 203 displayed in the cut-out modification screen operation processing state S14 (FIG. 5).

As shown in FIG. 22, a boundary area 506, a foreground area of the sea turtle on the inside of the boundary area 506, and a background area 507 of the sea turtle on the outside of the boundary area 506 are displayed based on a result (binary label image) of the boundary calculation.

In the initial state, the boundary color of the boundary area 506 is, for example, red as described above, though not sufficiently illustrated, and the background color of the background area 507 is, for example, blue as described above, though not sufficiently illustrated.

FIG. 23 shows a state of the cut-out modification screen 203 displayed in the cut-out modification screen operation processing state S14 (FIG. 5) in which the change color button 231 is pressed down once.

The user can instruct that the classification colors such as the boundary color and the background color be changed by pressing down the color change button 231 by operating the operation unit 37.

When the change color button 231 is pressed down once, the boundary color of the boundary area 506 changes into, for example, brown, which is not fully illustrated, and the background color of the background area 507 changes into, for example, green, which is not fully illustrated.

FIG. 24 shows a state of the cut-out modification screen 203 displayed in the cut-out modification screen operation processing state S14 (FIG. 5) in which the change color button 231 is pressed down twice.

When the change color button 231 is pressed down twice (pressed down one more time after the state of FIG. 23), the boundary color of the boundary area 506 changes to, for example, magenta, which is not fully illustrated, and the background color of the background area 507 changes to, for example, cyan, which is not fully illustrated.

When the change color button 231 is pressed down three times (pressed down one more time after the state of FIG. 24), the screen returns to the initial state of FIG. 22, the boundary color of the boundary area 506 returns to red, and the background color of the background area 507 returns to blue.

The coloring method of determining the boundary color and the background color is not limited to this, and any method can be employed as long as the method simply specifies 6 colors in total, which includes 3 colors as candidates for the first color of the background area and 3 colors as candidates for the second color of the boundary area, specified beforehand as being distinctly different from one another. Incidentally, in the above-described example, the assorted boundary colors are chosen from the red color family for consistency.

Figure 25:
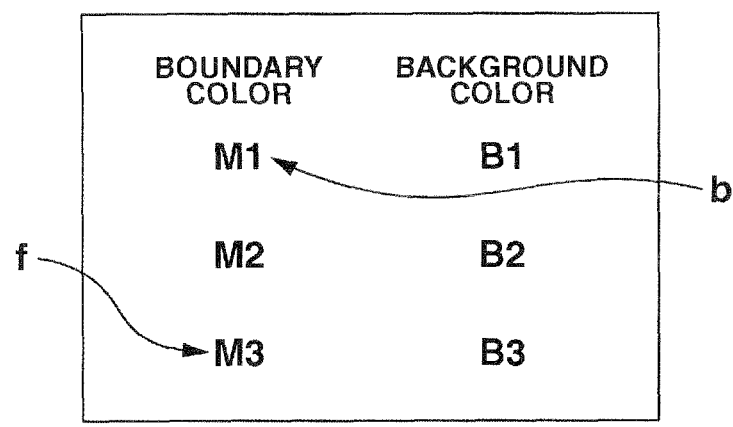
FIG. 25 is a diagram illustrating a coloring method of the boundary color and the background color when the image processing system shown in FIG. 4 carries out the cut-out processing.

FIG. 25 is a diagram illustrating such a coloring method of determining the boundary color and the background color.

As a premise here, when an area to be presently edited, i.e., a sufficiently small area is taken into account, the pixel values of the foreground area and the background area of the original image can be considered approximately constant. Although there may be a case in which changing the color assortment might be necessary while the user continuously edits each part of the image, such a case can be considered not to cause so much inconvenience.

Here, the constant foreground pixel value is denoted by "f", the constant background pixel value is denoted by "b", the 3 colors assorted as the boundary colors are denoted by "M1", "M2", and "M3", and the 3 colors assorted as the background colors are denoted by "B1", "B2", and "B3".

Under such a premise, the designer or the like selects the nearest color to the foreground pixel value f from among the 6 colors (the boundary colors M1 to M3 and the background colors B1 to B3). Also, the designer or the like selects the nearest color to the background pixel value b from among the 6 colors (the boundary colors M1 to M3 and the background colors B1 to B3). Here, as it is clear from FIG. 25, with whatever kind of correspondence shown by the arrows, there remains at least one pair in a row (the pair of M2 and B2 in the example of FIG. 25) where no arrow is drawn from the foreground pixel value f or the background pixel value b.

Therefore, provided that the 6 colors (the boundary colors M1 to M3 and the background colors B1 to B3) are assorted to be distinctly different from one another, the designer or like can select, as the boundary color and the background color, a pair in a row not directed by any arrows, thereby enabling to set a coloration, which does not provide resembling colors to the pixel value of the original image.

This coloration is commonly applied to the color (boundary color) of the approximate contour in the finishing area designation screen and the color (boundary color) of the intermediate label area of the trimap modified by the partial matte processing. Those colors are unified as a whole, and the colors are changed at the same time when the coloration is changed. The constitution of the finishing area designation screen is the same as that of the base screen 201 of FIG. 6; therefore, a description thereof is omitted.

The image processing system of the present embodiment, which can carry out the cut-out processing, has a fourth feature that can change the background of the finish check screen 204 (FIG. 12) to an arbitrary new background image, in addition to the above-described first, second, and third features.

Figure 26:
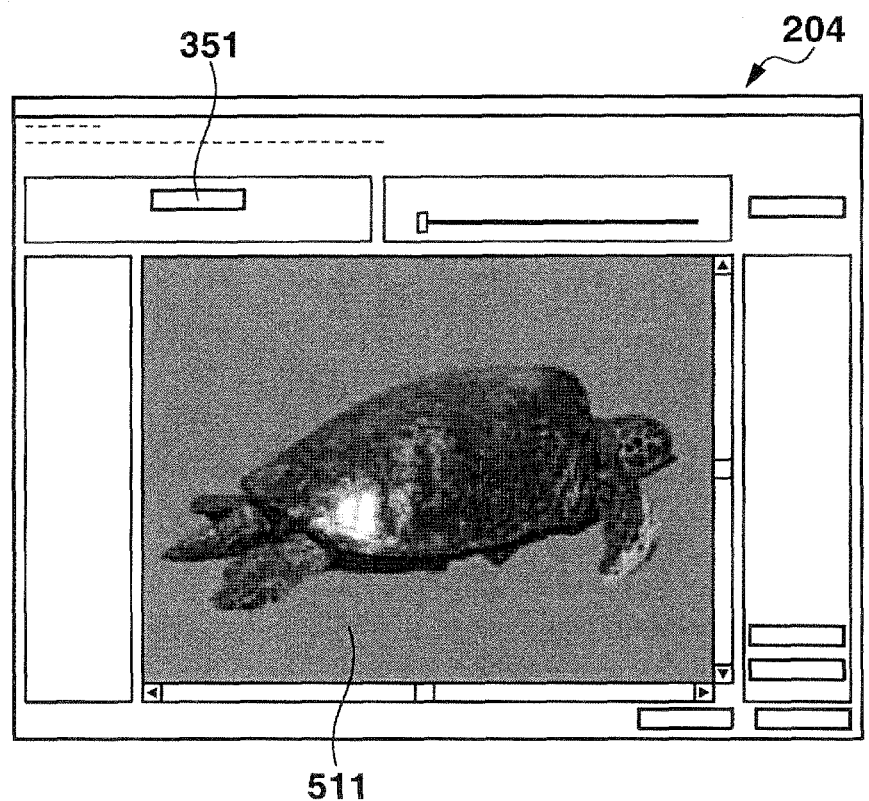
FIG. 26 is a diagram showing one example of a screen displayed when the image processing system shown in FIG. 4 carries out the cut-out processing.

Upon transition to the finish check screen operation processing state S44 (FIG. 10), a finish check screen 204 shown in FIG. 26 is displayed.

FIG. 26 shows one example of the initial state of the finish check screen 204 displayed in the finish check screen operation processing state S44 (FIG. 10).

As shown in FIG. 26, the finish check screen 204 displays a composite image of the foreground (sea turtle) cut out from the processing target image, on which the finish adjustment processing has been executed, and a new background image 511, which has been prepared in advance.

The user can change the background image displayed in the display area 211 to an arbitrary new background image by pressing down the change background button 351.

Figure 27:
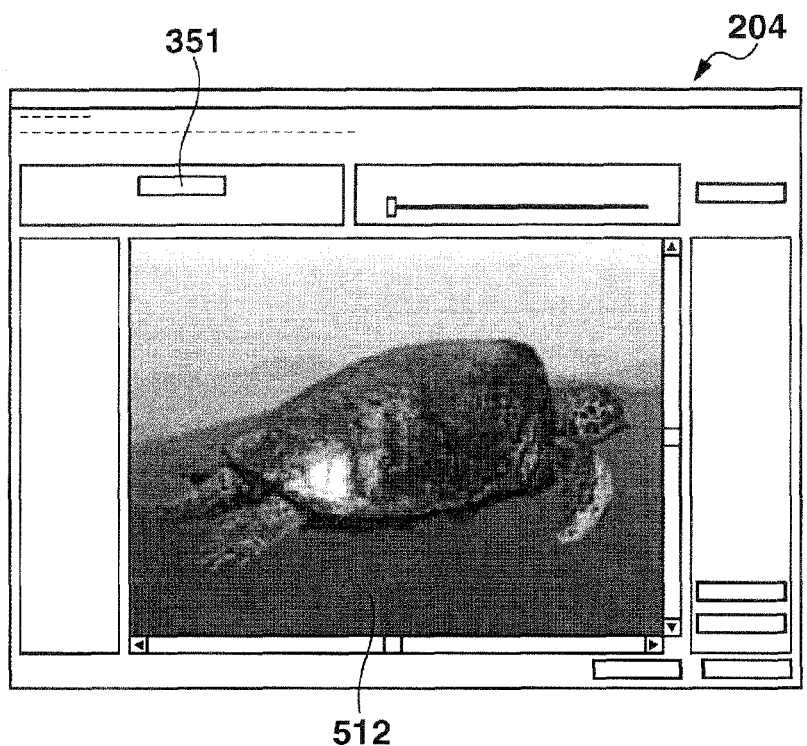
FIG. 27 is a diagram showing one example of a screen displayed when the image processing system shown in FIG. 4 carries out the cut-out processing.

FIG. 27 shows a state of the finish check screen 204 displayed in the finish check screen operation processing state S44 (FIG. 10) in which the change background button 351 has been pressed down once.

When the change background button 351 is pressed down once, the background image displayed in the display area 211 is changed to a new background image 512 shown in FIG. 27.

Figure 28:
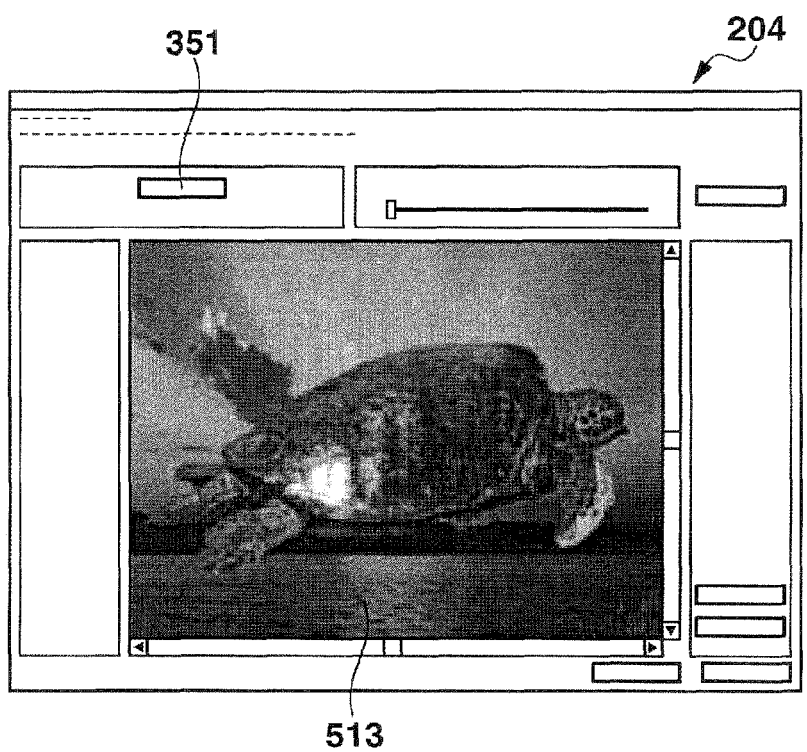
FIG. 28 is a diagram showing one example of a screen displayed when the image processing system shown in FIG. 4 carries out the cut-out processing.

FIG. 28 shows a state of the finish check screen 204 displayed in the finish check screen operation processing state S44 (FIG. 10) in which the change background button 351 has been pressed down twice.

When the change background button 351 is pressed down twice (pressed down one more time after the state of FIG. 27), the background image displayed in the display area 211 is changed to a new background image 513 shown in FIG. 28.

Figure 29:
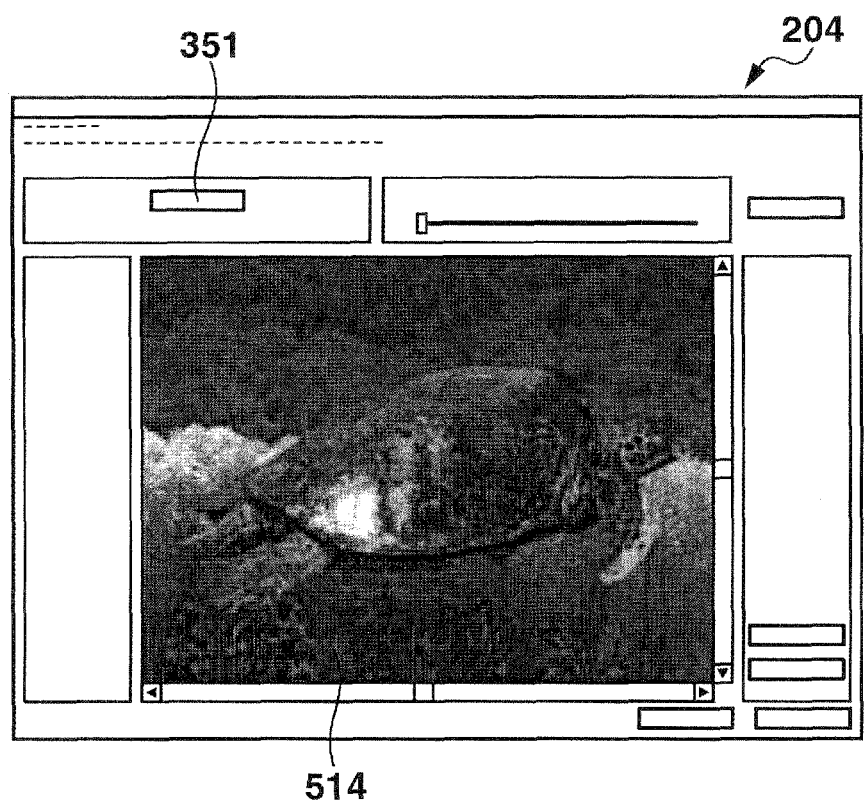
FIG. 29 is a diagram showing one example of a screen displayed when the image processing system shown in FIG. 4 carries out the cut-out processing.

FIG. 29 shows a state of the finish check screen 204 displayed in the finish check screen operation processing state S44 (FIG. 10) in which the change background button 351 has been pressed down three times.

When the change background button 351 is pressed down three times (pressed down one more time after the state of FIG. 28), the background image displayed in the display area 211 is changed to a new background image 514 shown in FIG. 29.

The user can repeat the modification operation on a select area (the foreground area to be cut out) until the user is satisfied with the select area. However, whether the result of the cut-out image is satisfactory or not also depends on the compatibility of the cut-out image with the new background image to be combined with. For example, it is difficult to imagine to what degree the mixed color is acceptable at the boundary based on the background image displayed in a single solid color alone.

If a targeted new background image is predetermined, necessary and sufficient results can be acquired if the targeted new background is displayed. However, the targeted new background is not always decided beforehand. Even if the targeted new background is not decided beforehand, it is preferable that a certain level of quality can be ensured as a result of finish processing regardless of what the new background image is.

Therefore, in the present embodiment, there are provided software buttons, i.e., the finish adjustment button 361 (FIG. 12) and the check screen button 372 (FIG. 13) that allow the user to go back and forth between the finish check screen 204 (FIG. 12) as a checking screen and the finish adjustment screen 205 (FIG. 13) as an editing screen. Furthermore, there are provided a set of new background images that can express representative coloration and complexity to cover typical cases to a certain degree, and the background images are prepared so as to be cyclically switched and displayed one after another by simply pressing down (clicking on) the change background button 351.

In this manner, for example, if a user has a specific background image in mind, the user can use a new background image resembling the specific background image and thereby easily view and recognize the quality of the result. Further, for example, if a user desires to ensure a certain level of quality for all types of backgrounds, the user can easily view and recognize the quality of the result by sequentially using all of new background images. If the user determines that the quality is insufficient, the user can cause the finish adjustment screen 205 (FIG. 13) to be displayed as an editing screen and then easily go back to the editing operation.

It should be noted that the present invention is not limited to the embodiment described above, and any modifications and improvements thereto within the scope in which an object of the present invention can be realized, are included in the invention.

For example, in the embodiment described above, the cut-out processing is carried out by collaboration between the client apparatus 11 and the server 12 (FIG. 4). However, either the client apparatus 11 or the server 12 may carry out the processing on its own terms.

Here, a system is defined as the entire devices consisting of a plurality of devices or processing units. If one device is assumed to be accommodated within a range of a single housing, an image processing apparatus, to which the present invention is applied, may be constituted by a plurality of devices or one device. In a case in which the image processing apparatus is constituted by a plurality of devices, it should suffice that the devices as a whole provide the whole function of the cut-out processing unit 102 shown in FIG. 4. In this case, one function of the cut-out processing unit 102 may be provided by an arbitrary number of devices from among the plurality of devices.

Furthermore, in the embodiment described above, a description has been given in which the image processing apparatus according to the present invention is configured by a personal computer or the like. However, the present invention is not limited thereto and can be applied to any electronic device having an image processing function. More specifically, the present invention can be applied to a video camera, a portable navigation device, a portable game device, and the like.

The series of processing described above can be executed by hardware and also can be executed by software.

In a case in which the series of processing is to be executed by software, the program configuring the software is installed from a network or a storage medium in a computer or the like. The computer may be a computer incorporated in dedicated hardware. Alternatively, the computer may be a computer capable of executing various functions by installing various programs, for example, a general-purpose personal computer, for example.

The storage medium containing the program can be constituted not only by the removable media 42 (FIG. 2) and 61 (FIG. 3) distributed separately from the device main body for supplying the program to a user, but also by a storage medium or the like supplied to the user in a state incorporated in the device main body in advance. The removable media are composed of a magnetic disk (including a floppy disk), an optical disk, a magnetic optical disk, or the like, for example. The optical disk is composed of a CD-ROM (Compact Disk-Read Only Memory), a DVD (Digital Versatile Disk), and the like. The magnetic optical disk is composed of an MD (Mini-Disk) or the like. The storage medium supplied to the user in the state incorporated in the device main body in advance includes the ROM 32 (FIG. 2) and 52 (FIG. 3) storing the program, a hard disk and the like included in the storing unit 39 (FIG. 2) and 58 (FIG. 3), for example.

It should be noted that, in the present description, the step describing the program stored in the storage medium includes not only the processing executed in a time series following this order, but also includes processing executed in parallel or individually, which is not necessarily executed in a time series.

What is claimed is:

1. An image processing apparatus that displays a captured image such that the captured image is divided into a plurality of areas, the image processing apparatus comprising:
   a detecting unit that detects a foreground area including a foreground object, a background area, and a boundary area between the foreground area and the background area, from data of the captured image, which is a processing target image;
   a display control unit that executes control to display the boundary area in a first classification color that is distinguishable from other areas, and the background area in a second classification color that is different from the first classification color, when the processing target image is displayed; and
   a changing unit that selects, in accordance with an instruction from a user, one pair of colors to be the first classification color and the second classification color, from among a plurality of pairs of colors for the first classification color and the second classification color that are specified beforehand, and changes the first classification color and the second classification color displayed by the display control unit to the selected pair of colors.

2. An image processing apparatus as set forth in claim 1, wherein the display control unit executes control to display the background area and the boundary area in semi-transparent colors.

3. An image processing apparatus as set forth in claim 2, further comprising a transparency rate changing unit that changes a transparency rate in an area displayed in the semi-transparent colors.

4. An image processing method for an image processing apparatus that displays a captured image such that the captured image is divided into a plurality of areas, the method comprising:
   detecting a foreground area including a foreground object, a background area, and a boundary area between the foreground area and the background area, from data of the captured image, which is a processing target image;
   executing control to display the boundary area in a first classification color that is distinguishable from other areas, and the background area in a second classification color that is different from the first color, when the processing target image is displayed; and
   selecting, in accordance with an instruction from a user, one pair of colors to be the first classification color and the second classification color, from among a plurality of pairs of colors for the first classification color and the second classification color that are specified beforehand, and changing the first classification color and the second classification color displayed by the display control unit to the selected pair of colors.

5. A non-transitory computer-readable storage medium storing a program that is executable by a computer that controls an image processing which displays a captured image such that the captured image is divided into a plurality of areas, the program being executable to cause the computer to function as units comprising:
   a detecting unit that detects a foreground area including a foreground object, a background area, and a boundary area between the foreground area and the background area, from data of the captured image, which is a processing target image;

a display control unit that executes control to display the boundary area in a first classification color that is distinguishable from other areas, and the background area in a classification second color that is different from the first color, when the processing target image is displayed; and a changing unit that selects, in accordance with an instruction from a user, one pair of colors to be the first classification color and the second classification color, from among a plurality of pairs of colors for the first classification color and the second classification color that are specified beforehand, and changes the first classification color and the second classification color displayed by the display control unit to the selected pair of colors.

* * * * *